US010769497B2

United States Patent
Haneda et al.

(10) Patent No.: US 10,769,497 B2
(45) Date of Patent: Sep. 8, 2020

(54) LEARNING DEVICE, IMAGING DEVICE, AND LEARNING METHOD

(71) Applicant: Olympus Corporation, Hachioji-shi, Tokyo (JP)

(72) Inventors: Kazuhiro Haneda, Hachioji (JP); Hisashi Yoneyama, Hino (JP); Atsushi Kohashi, Akiruno (JP); Zhen Li, Hino (JP); Dai Ito, Hamura (JP); Yoichi Yoshida, Inagi (JP); Kazuhiko Osa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 123 days.

(21) Appl. No.: 16/043,057

(22) Filed: Jul. 23, 2018

(65) Prior Publication Data

US 2019/0197359 A1 Jun. 27, 2019

(30) Foreign Application Priority Data

Dec. 24, 2017 (JP) .................................. 2017-247107
Mar. 29, 2018 (JP) .................................. 2018-064100

(51) Int. Cl.
| G06K 9/00 | (2006.01) |
| G06K 9/62 | (2006.01) |
| G06N 3/08 | (2006.01) |
| G06N 20/10 | (2019.01) |

(52) U.S. Cl.
CPC ............. *G06K 9/6262* (2013.01); *G06N 3/08* (2013.01); *G06N 20/10* (2019.01)

(58) Field of Classification Search
CPC ......... G06K 9/6262; G06N 3/08; G06N 20/10
See application file for complete search history.

(56) References Cited

U.S. PATENT DOCUMENTS

| 2006/0023916 A1* | 2/2006 | Yang ..................... G06K 9/6234 382/103 |
| 2015/0036003 A1* | 2/2015 | Sakurai ..................... H04N 1/00 348/207.11 |

FOREIGN PATENT DOCUMENTS

JP 2015-173307 10/2015

\* cited by examiner

*Primary Examiner* — Khai M Nguyen
(74) *Attorney, Agent, or Firm* — John C. Pokotylo; Pokotylo Patent Services

(57) ABSTRACT

A learning device, comprising a reception circuit that receives requests indicating photographs the user likes from external device, a machine learning processor that extracts images that match the requests and that have received a given evaluation from a third party, from within an image database, performs machine learning using these images that have been extracted, and outputs an inference model, and a transmission circuit that transmits an inference model that has been output from the learning processor to the external device.

20 Claims, 11 Drawing Sheets

LEARNING DEVICE, IMAGING DEVICE, AND LEARNING METHOD

CROSS-REFERENCE TO RELATED APPLICATIONS

Benefit is claimed, under 35 U.S.C. § 119, to the filing date of prior Japanese Patent Application Nos. 2017-247107, filed on Dec. 24, 2017, and 2018-064100, filed on Mar. 29, 2018. These applications are expressly incorporated herein by reference. The scope of the present invention is not limited to any requirements of the specific embodiments described in these applications.

BACKGROUND OF THE INVENTION

1. Field of the Invention

The present invention relates to a learning device, an imaging device, and a learning method that can be applied to a portable terminal device, a camera, etc. Using third party evaluations of images stored in a database, this learning device, imaging device and learning method can consider such evaluations at the time of shooting by the imaging device.

2. Description of the Related Art

It has been proposed to store image data in a database, and to perform information exchange while maintaining confidentiality between associated terminals (refer, for example, to Japanese patent laid-open No. 2015-173307 (hereafter referred to as "patent publication 1")). This information processing system disclosed in patent publication 1 constructs a database in which characteristic information of a taken image of a person, position information and time information that are used as safety conformation information when an earthquake has occurred, are stored in association with each other. It is possible to easily retrieve images that are similar to taken images of a person being sought.

Conventionally, proposals for retrieving an image database are already in effect. However, there have been no proposals at all regarding extracting effective information from an image database that would be useful in helping a user to shoot a high-quality (e.g., in terms of third party evaluations) image.

SUMMARY OF THE INVENTION

The present invention provides an imaging device that can help a user to acquire images that are expected to be evaluated highly by a third party. Also, an object of the present invention is to provide a learning device, imaging device, and learning method that perform machine learning using image data that has been stored in a database in order to generate an inference model (such as weights of a trained neural network), and that can provide guidance information to help a user to shoot images that are expected to be evaluated highly by a third party using the generated inference model.

An imaging device of a first aspect of the present invention comprises a setting circuit that sets, based on user input, requests representing photographs a user desires (e.g., in terms of a theme of the image and an intended audience for the image), a transmission circuit that transmits the requests that have been set by the setting circuit to an external learning device, a reception circuit that retrieves images that match the requests (e.g., images of the set theme that have been evaluated by the set type of audience) from an image database, performs machine learning using these retrieved images, and receives inference models (e.g., weights of a trained neural network) that have been output from a learning processor that outputs inference models, and a display, wherein the display displays inference results that have been generated using the inference models and new (e.g., Live View) images.

A learning device of a second aspect of the present invention comprises a machine learning processor that retrieves images, that have received an evaluation from a third party, from within an image database, performs machine learning using these retrieved images, and generates a plurality of inference models (e.g., sets of weights for trained neural networks), a reception circuit that receives shooting conditions of an imaging device and/or taken images of a user from the imaging device, a controller that selects an inference model from among the plurality of generated inference models that is most appropriate to the user based on the shooting conditions and/or the taken images, and a transmission circuit that transmits the most appropriate inference model that was selected by the controller to the imaging device.

A learning method of a third aspect of the present invention comprises: (1) receiving a request that represents photographs that the user wants from an imaging device, (2) retrieving images that match the request and that have received an evaluation from a third party from within an image database, (3) performing machine learning using these retrieved images to generate an inference model(s), and (4) transmitting the inference model(s) that have been generated, to the imaging device.

A learning method of a fourth aspect of the present invention comprises: (1) retrieving images that have received an evaluation from a third party from an image database, (2) performing machine learning using these retrieved images to generate a plurality of inference models, (3) receiving a request that represents photographs that a user wants and/or taken images of the user, from an imaging device, (4) selecting an inference model that is most appropriate to the user from among the plurality of inference models, based on the requests and/or the taken images, and (5) transmitting the most appropriate inference model (that has been selected) to the imaging device.

A learning method of a fifth aspect of the present invention comprises: (1) receiving a request from an external device, (2) retrieving data that matches the request and includes evaluation information for which there is a difference in subjective evaluation for each data, from a database, (3) performing machine learning using groups of this retrieved data to generate inference models for subjective evaluation prediction, and (4) transmitting the inference models that have been output to the external device.

DETAILED DESCRIPTION OF THE PREFERRED EMBODIMENTS

Figure 1A:
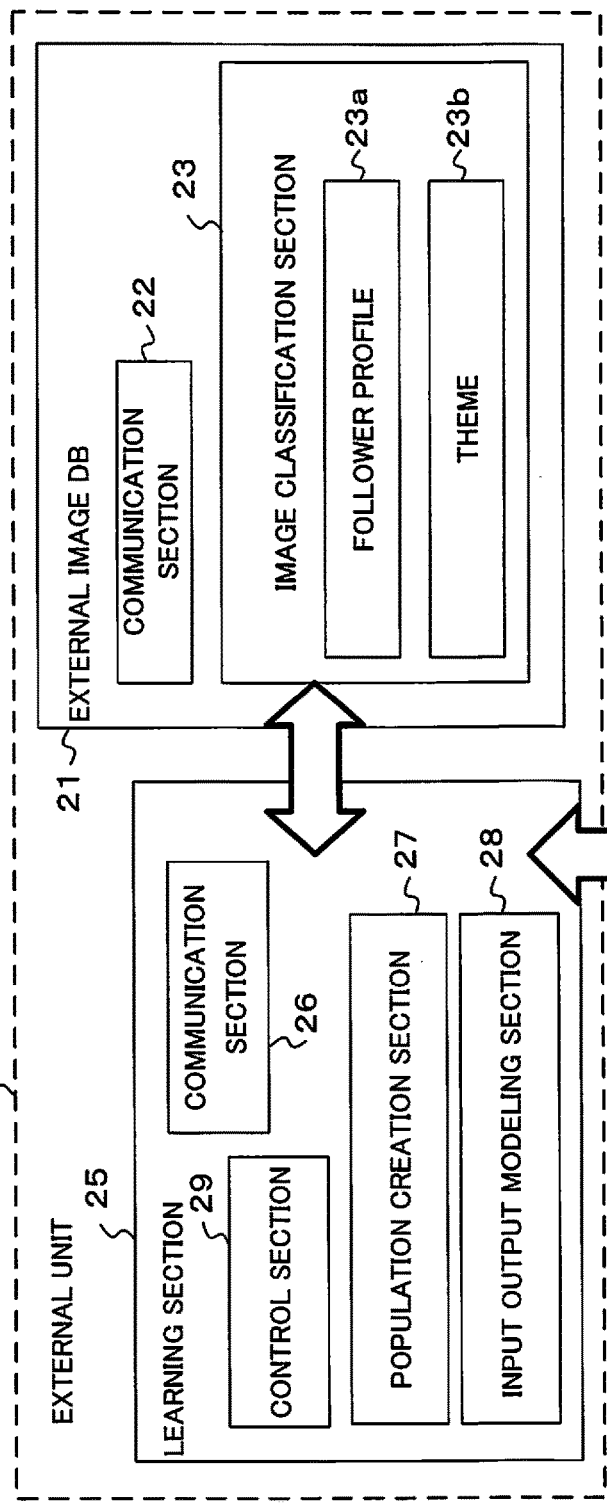
FIG. 1A is a block diagram showing a learning system of a first embodiment of the present invention.

An example where the present invention is provided in a learning system comprising a camera (imaging device) and an external unit, as a preferred embodiment of the present invention, will now be described. In the following, "third party" may refer to a single person (e.g., a single evaluator), or some group of people (e.g., evaluators) fitting a desired profile. An overview of this learning system is given in the following. The camera can be connected to the external unit via a network. Images are stored in the external unit, a third party can access the images, and a third party can evaluate the images that they have accessed. The external unit also retrieves a set of image data from an image database (e.g., using an image theme and/or an evaluator profile to filter the image data), and performs machine learning (including deep learning) to generate one or more inference models (e.g., weights of trained neural networks). It should be noted that a third party may be anyone except the person who receives image evaluations, for example, the camera user themselves, a specialist in a specific field, etc.

Also, the given evaluation of an image may be a subjective evaluation (e.g., a quality judgment) from a third party. This subjective evaluation may be, but is not limited to, an affirmative evaluation ("high evaluation"). For example, the subjective evaluation may also be an evaluation where an image is not evaluated affirmatively, in which case the evaluation is inferred rather than based on an express input of the third party. Also, the evaluation is not limited to simply whether or not it is affirmative. That is, the evaluation is not limited to a binary (YES or NO) value, but may be a quantitative evaluation that uses a degree of approval. For example, a quantitative evaluation may be one of levels 1 to n (and may also be represented by a number of stars). Images may be quantitatively evaluated by analyzing comments that have been accumulated for images, etc., and expressing degree of favorability in numerical form. For example, there are various methods for performing quantitative evaluation, such as creating a database by searching for affirmative words and negative words included in text that has been left as comments, analyzing comparison results of frequency of appearance of those words and further analyzing those words that have appeared, and converting degree of favorability of those words into a numerical score representing a perceived quality of the image to the third party, etc. It is also possible to infer a degree of favorability of an image based not only on text comments, but also based on unconscious movements of a user accessing that image. For example, if an image is looked at for a long time, and many times, it is often the case that viewers see the image favorably. It is also possible to consider frequency and time of accesses to such images, and a number of times an image has been downloaded, when determining a quantitative evaluation score. Regarding this type of quantitative evaluation, there may also be cases of affirmation inclusive of background of a person who has contributed an evaluation (e.g., an evaluator's profile), and not for image quality of an image itself or expressive power itself. By considering this point, there may also be cases such as evaluating an image from the viewpoint of whether or not a photograph appears to be taken by person with a lot of "followers" on a social media platform (e.g., Facebook, Instagram, twitter, etc.). For example, there may be a famous person who is extremely popular (provisionally referred to as "person A"), and a shooting tendency to take a picture like that person The user wants to learn, or follow, person A's photo skill. That is, it is possible to provide a shooting device that can help a user to take pictures (e.g., of an object, or pertaining to a theme) that person A would take.

Also, the camera sets user requests (e.g., requirements in terms of theme of the image and/or profile of evaluator(s)) and transmits the requests to the external unit. These requests indicate requirements for photographs taken by the user so that they will be likely to be receive a high evaluation by a third party. As an example, the user might want to take photographs that will be liked by young French girls, so the request would request is the photographs which French young girls will say "good" or "like". For example, evaluator profile information in a request may be used to designate "from what type of third party evaluator is it desired to receive a high evaluation". With a "photograph" as an example, there were previously often simple evaluations that were vague and stated only "good photograph" or "well taken photograph", or alternatively "boring photograph" or "badly taken photograph". However, conditions (e.g., evaluator profile and/or image theme) set in the requests of this embodiment may categorize evaluators taking into consideration differences in demographic, gender, cultural area, age, etc. This is intended to help a user take pictures that a person, fitting a particular profile from among a plurality of categories and demographics, would particularly like. Many users or camera operators often cannot be confident of completely understanding what will be liked, even for a culture and age group that they themselves belong to. However, this embodiment enables a user to take photographs that dispel such uncertainty. This means that even if a user has been asked to shoot photographs by a person in an unknown locality and of a different age group or gender to themselves, it becomes possible to simply take photographs that will likely fulfill and satisfy that request. Such requirements have been described as examples of a request.

However, since it might be troublesome for a user to input requests (e.g., specifying "French" and "young" and "girl") by manual operation each time, a request itself may be automatically determined in some example embodiments consistent with the present invention. For example, a majority profile of a social network service ("SNS"), a majority profile of those who evaluative images (e.g., in general, or a specific type or category of images) on the SNS, a most influential profile in the SNS, or a most influential profile who evaluate images (e.g., in general, or a specific type or category of images) on the SNS, may be selected automatically. Furthermore, since the external image database might not have all of demographic criteria sought by the user (for example, if data is from a social networking site with members belonging to a limited demographic group, or members who review images belonging to a limited demographic group), the user's request (e.g., a photo and specified reviewer demographic information) might not receive a good response if there is insufficient data from users of the desired demographic. In this case, the user might be required to select other target demographic groups. For example, the system might indicate (e.g., directly, or via drop down menu choices, or via radio button selections) which user demographic group(s) the user may select. In this way, for example, if the image database only has images judged by old Japanese men, the user will not waste time asking for images judged by young French girls. Further, in this way, generating a request automatically is useful when the user cannot input settings for an appropriate request even with effort, and makes it possible for the user to perform shooting that reflects a target viewer's sensibility and point of view on evaluation which the user is unaware of, or fails to realize even with effort to do so.

With many previous devices, it was common to pursue technology so as to assist a user's ability to shoot images having a more general "nicely taken" level. That is, devices have been developed and provided that help a user to shoot images that satisfy a level such as a beginner "will not fail". With devices that were manufactured from such design standpoints, such as a camera for example, even if it is possible to take so-called "suits everyone" photographs, it was not possible to help the user to shoot images likely to meet meticulous requests, as has been described here.

It should be noted that there may be cases where this viewer preference changes depending on the theme of images to be taken. Consequently, the request may include an "image theme" setting. Therefore, there may be inference models so as to determine theme of taken images, such as the image theme is "scenery" or the image theme is a "person", etc. If a theme is determined, there may be an inference model such that preference of a viewer is inferred for every theme. However, regardless of theme, since there are also cases where there is an overall trend, with the following describes the broad concept of "request". How finely a request is designated will change depending on what the user intends to shoot (e.g., a desired theme of the image), and/or the user's desired audience (e.g., viewer profile). Further, the ability to generate an inference model (e.g., weights of a trained neural network) may depend on the availability of previously evaluated images as training data. For example, an evaluation model for estimating how Canadian men would like images of dogs would be impossible if training data images were limited to images of cats evaluated by German girls. As a user request also, to what extent requests will be categorized would change with time and conditions. For example, different users having different backgrounds may have different requests, or different types of requests.

Further, it is determined who an image was evaluated by, and not only is determination performed as to whether an image conforms or does not conform to the needs of the evaluator, but also various advice may be provided to the photographer. For example, for an image that has been determined to not likely conform with a target viewer's (or target viewer group) preference, advice may be provided to the user regarding photographing parameters and/or trimming on image acquisition, and in this case, trimming position for the image is a useful reference. Alternatively, modifications (shooting change) may be made on whether or not to apply image processing for special effects, and types of image processing, etc. In a case where images have been acquired with different representation methods depending on the image processing, etc., this image is once again input to a previously determined inference engine and it is determined whether a high evaluation is received. If the result of determination is that there is a modification (e.g., in terms of image processing) that would contribute to improving evaluation, advice to carry out this shooting change may be output and conveyed to the user. For example, evaluations of an image with different image processing applied (e.g., black and white versus color, blurred versus vivid, etc.) may be performed by a previously determined inference engine in order to determine image processing most likely to help the image receive a good evaluation by a target viewer (or target viewer group). As a result of this advice, techniques that the photographer did not know themselves can be learned by the photographer, and the photographer's skill is further improved.

The external unit performs deep learning (e.g., neural network training) using requests that have been set at the camera side. The settings in a request are used as filters to retrieve images from a database of the image data. The retrieved images are used to perform deep machine learning (e.g., to train a neural network), and inference models (e.g., weights of trained neural networks) that have been generated as a result of this deep learning are transmitted to the camera side (refer to the first embodiment). Also, the external unit may create a plurality of these inference models in advance (e.g., for different image "themes" and/or for different evaluator profiles). As was described previously, since there are various requirements in a request, and also various advice, a plurality of inference models may be generated by the external unit, taking these requirements and advice into consideration. Also, the external unit may select an optimum (most appropriate) inference model for the user from among a plurality of inference models, based on image data, etc., that is stored in the camera, and returns the selected inference model to the camera (refer to second embodiment).

It should be noted that in each of the embodiments of the present invention, inference models might be generated by deep learning. However, besides deep learning, there are other types of machine learning (for example, SVM (Support Vector Machine)), and some of the learning may also be performed by machine learning that is performed using a person's judgment.

Next, a first embodiment of the present invention will be described using FIG. 1A to FIG. 4. FIG. 1A is a block diagram mainly showing the electrical structure of a learning system of the first embodiment. This learning system has a camera 10 and an external unit 20.

The camera 10 has an image input section 11, an inference engine 12, a communication section 14, a display section 15, a setting section 16 and a control section 17. This camera 10 functions as an imaging device that transmits requests and receives inference models. The image input section 11 has a photographing lens, image sensor, imaging control circuit, image data processing circuit, etc., and generates image data of a subject. The image input section 11 functions as an image input that inputs image data. The image input section 11 functions to convert a subject to image data.

The inference engine 12 is input with one or more inference models (e.g., values of weights of a trained neural network) that have been generated by an input output modeling section 28, described later, within the external unit 20, and stores the one or more input inference models in a storage section 13. Using the inference models that have been stored in the storage section 13, the inference engine 12 determines whether or not image data that has been input by the image input section 11 is for an image that matches a request that has been set by the setting section 16 (described in detail later). The inference engine 12 has an input layer, one or more intermediate layers, and an output layer, similar to FIG. 4, with strength and weighting of neuron connections between these layers being set in accordance with the previously received inference models) that have been stored in the storage section 13.

The inference engine 12 performs inference for image data using one or more inference models. The inference engine 12 may also perform inference for image data using a learning interim inference model. A "learning interim inference model" is a reliable inference model that has been generated using image data in a certain range that has been determined (refer, for example, to S41 and S45 to S49 in FIG. 3). The inference engine 12 may also determine whether or not image data, that has been input using image input, will be likely to receive a given binary evaluation (e.g., "good" or "not good"), or to determine an estimated evaluation (e.g., a value on a scale from 1 to n) from a third party, using the one or more inference models that have been received by the reception circuit. That is, as a given evaluation there may be an affirmative evaluation (high evaluation), and there may be a quantitative evaluation.

The communication section 14 has a communication circuit and performs wireless and/or wired communication with a communication section 26 of the external unit 20, by means of the Internet or the like. This communication section 14 transmits requests that have been set in the setting section 16 to a learning section 25 in the external unit 20, and inputs one or more inference models that have been generated by the input output modeling section 28. The communication section 14 functions as a transmission circuit that transmits requests that have been set in a setting circuit to a learning section 25 (refer, for example, to S25 in FIG. 2). The communication section 14 also functions as a reception circuit that receives one or more inference models that have been generated by the learning section, based on data retrieved from an image database 21 using settings (e.g., image theme and/or evaluator profile information) in a request (refer, for example, to S27 in FIG. 2).

If the camera 10 cannot directly access the external unit 20, the camera may communicate with the external unit 20 indirectly, by means of a portable communication device such as a smart phone. Also, if the camera 10 itself is incorporated into a portable communication device such as a smartphone, the camera may communicate with the external unit 20 by means of this portable communication device.

Figure 1B:
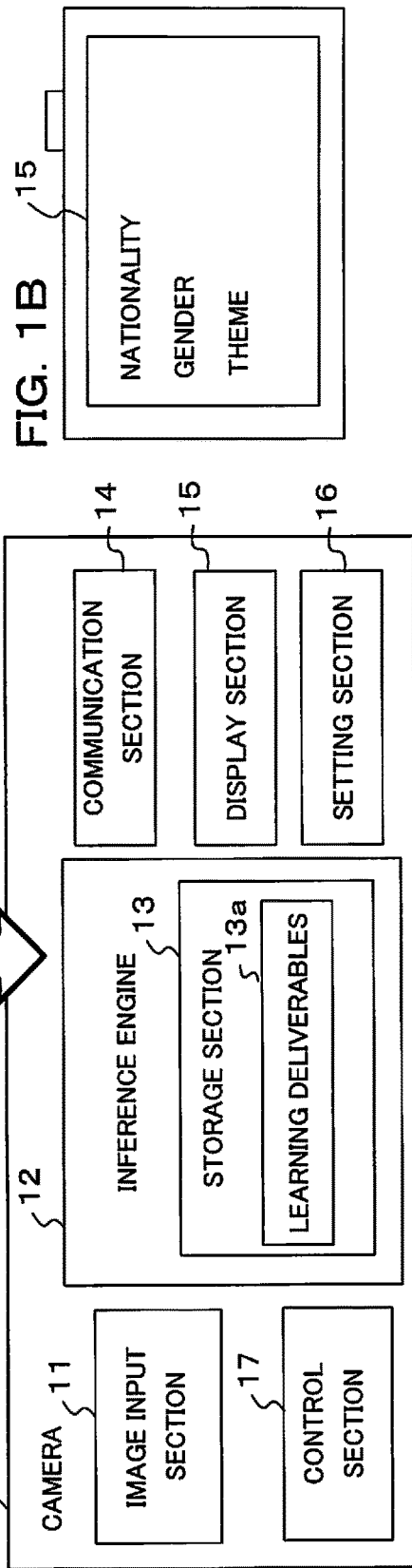
FIG. 1B is a drawing showing one example of a display on a display section of a camera within the learning system.

The display section 15 has a display panel or the like, and may perform display of a through image (also called "live view image") based on image data that has been acquired in the image input section 11. The display section 15 also performs display of inference results of the inference engine 12. The display section 15 also performs display of items that are set in the setting section 16, such as shown in FIG. 1B. The display section 15 functions as image input that displays inference results from the inference section (refer, for example, to S7 in FIG. 2). The display section 15 functions as a display that performs advice display based on image data that has been input by the image input and advice information (refer, for example, to S61 in FIG. 7A). The display section 15 also displays inference results derived using one or more inference models (refer, for example, to S7 in FIG. 2). The display also displays inference results while performing through image display.

The setting section 16 has a setting circuit (input circuit), and sets information (e.g., image theme and/or evaluator profile information) for retrieving photographs (e.g., stored in the image database 21 that have been evaluated highly by a third party and that the user desires. Images that a third party or third parties can browse are uploaded to the external image database 21, the third party (or third parties) browses the uploaded images. If a third party likes an image, an expression that indicates that the image is to their liking, such as "like" is received. This expression is stored in the external image database 21 by means of a network, and published by means of the network. The expression may also be based on a numerical score entered by the third party. The expression may also be inferred based on actions (e.g., long or short dwell time, number of repeated viewings, etc.) by the third party with respect to the image. The user might want to take photographs that are likely to gain a high evaluation from a third party (or a group third parties having a given profile) and to meet the user's preference. With this embodiment, in order to satisfy the user's request, the learning section 25 creates an inference model based on the user's request, and the camera 10 performs evaluation of images that have been input by the camera 10 using this inference model. For example, settings in the user's request may be used as filters to retrieve a set of images from the image database 21. These retrieved images are then used to train a neural network by the input output modeling section 28. The weights of the trained neural network are then used as an inference model.

The setting section 16 sets the above described user requests. For example, in a case where the user wishes to shoot "photographs that will receive a positive evaluation from. French girls in their twenties", the user sets evaluator profile information such as nationality and gender of the evaluator (target viewer) and/or theme of the image so as to satisfy this user request. Themes may include, for example, photographed objects such as scenery, people, food, pets, clothing, etc., but this is not limiting.

A "scene" is a concept that is similar to "theme". More specifically, with many cameras, etc., results of having analyzed images and data that have been detected are referred to as various types of "scenes". For example, functions such as face detection and scenery determination are sometimes called a "scene determination function". "Scene" used here can be considered to be "theme" if suitable. However, there may be cases where the word theme is intended to include ideas that are beyond simple classification. For example, while a specified "local presentation" may be a theme (e.g., Paris), there may be not only scenery and people of that locality, but also different scenes included. There may be cases where this "local presentation" is not only the presentation of simply scenery and people, but also the intention to give a bright impression. In this case, since overall cheerful images might be preferable, etc., it may be desired by the user to reflect the feeling of the image. Specifically, whether machine learning is performed taking into account such "intentions" is important only from the viewpoint of whether or not a set of images corresponding to the intention will be retrieved, and so with this embodiment it is considered that themes and scenes can be applied as long as they can be classified.

Also, as shown in FIG. 1B, the items of accompanying information are displayed as setting items on the display screen of the display section 15, and the user may select setting items by means of a touch operation and/or button operation in accordance with the request. Also, setting items may be selected from among items that have been displayed, and details input using text. Also, in a case where the user request is, for example, "photographs that will receive a positive evaluation from French girls in their 20s", the user request may be transmitted to the learning section 25 using natural language as it has been input, and the learning section 25 may perform deep learning by the request from an analyzer for the natural language. The profile of a person (intended audience) who has evaluated an image with a "like" (of who has otherwise explicitly or implicitly evaluated images) may also be included in the request. Items that have been set in the setting section 16 are transmitted from the communication section 14 to the learning section 25 as a request from the user.

A request setting screen for the setting section 16 displays "nationality", "gender", "age", "theme", etc., like the example shown in FIG. 1B, for example. In the case of a user request of "photographs that will receive evaluation from. French girls in the twenties", text of "French" is input by selecting "nationality", "female" is selected as "gender", and "twenties" is selected as "age". If there is a theme of a photographed object (e.g., a dog), text input is performed for "theme". In this case, the user wants a viewing audience of French girls in their 20s to like their pictures of dogs.

It should be noted that as setting items for a request, items other than those illustrated may be added, and some may be omitted. The above-described request has at least one among accompanying information of an evaluator and theme of a photograph the user desires. The setting section 16 functions as a setting circuit (input circuit) that sets requests representing a target audience that the user wants to like their images of a given theme (refer, for example, to S23 in FIG. 2).

The control section 17 has a CPU (Central Processing Unit), peripheral circuits and a memory, etc., and the CPU carries out control of each section within the camera 10 in accordance with a program that has been stored in memory.

The external unit 20 has an external image database (DB) 21 and a learning section 25. The external image DB 21 and the learning section 25 may be arranged within the same unit, or may be arranged in separate unit (which may communicate with one another). The external image DB 21 and the learning section 25 may be capable of cooperating with each other by means of communication. Also, a plurality of external image DBs 21 may be provided, and it may be possible for the communication section 26 and the communication section 22 to communicate with the plurality of external image DBs to access image data, and acquire information relating to image data from the learning section 25.

The external image DB 21 has a communication section 22 and an image classifying section 23. The external image DB 21 can be accessed by a third party, as was described previously, and if a third party likes the image the fact that the third preference has been met is expressed as an expression, such as "like". Other forms of third party evaluations (express and/or implied) may be received and stored. This expression is stored in the external image database in association with the image that has been evaluated, by means of a network, and published by means of the network. The communication section 22 has a communication circuit and performs exchange of data with the communication section 26 of the learning section 25.

The image classifying section 23 may be used to classify image data stored within the external image DB 21, or stored in an image DB that is external to the external image DB 21. Third party (evaluator) profiles 23*a* and/or image themes 23*b* are stored in the image classifying section 23. Generally, image data and third party evaluations relating to that image (for example, a number of evaluations of "like" by a third party) are stored in the image DB 21 in association with each other. Third party profiles 23*a* store information (third party evaluator profile, for example, a region where the third party lives, gender, age, etc.) relating to a person (third party) who has given an evaluation of "like" (or some other form of evaluation). The themes 23*b* store image themes, for example, information such as photographed object (for example, scenery, people, food, pets, clothing, etc.) in association with an image.

Since the image classifying section 23 is configured in this way, it is possible to determine and display comments that have been attached to images from tag information relating to image data and categorization analysis results. It should be noted that if the categorization analysis results are stored in the form of a table that conforms to specified syntax, determination of comments is made simple. Comments are also contributed by third parties after logging in. At the time of this login, tags and a table, etc., may be configured such that the third party who provided comment contributions can be identified. Also, in order to be able to login, a third party may be required to register a profile that includes name (or nickname or handle name), gender, date of birth, address, telephone number, mailing address, etc. Therefore, at the time of profile registration, it is possible to know the address of that third party evaluator (how long they have been living there and whether they are a native) from content that has been expressly entered by the third party, applications that are used, language used, terminal information, and usage (e.g., Web browser) history, etc. Similarly, age is also known. In this way, nickname, name and attributes of a person who commented on an image is known based on profile information that has been stored in a database for managing images. Also, that person's preferences and further their gender, age group and profile, etc., can be analyzed by browsing history of network information for what type of comments that person leaves. However, it might not be possible to fully know how the database categorizes people based on comments in their profile. Therefore, it is possible to search by replacing with a demographic group of similar profile, or acquiring profile information from an image database, in order to select necessary information for analysis.

The learning section 25 has the communication section 26, population creation section 27, input output modeling section 28, and control section 29. The learning section 25 has a machine learning (including deep learning) processor, and functions as a machine learning processor that retrieves images that satisfy a request that has been transmitted from the camera 10, and that have an evaluation from a third party, from the image database, performs machine learning (including deep learning) using this extracted image (to train a neural network), and outputs an inference model (e.g., as weights of the trained neural network) (machine learning processor for learning result generation that is input with learning data and learning parameters of a neural network or the like, and performs machine learning by various methods) (refer, for example, to S31 to S39 in FIG. 3).

Because the number of images that have been given an evaluation such as "like" differs significantly in accordance with theme, etc., of an image that is the object of a request by the user, the given value mentioned above may be appropriately set in accordance with various circumstances, such as image theme. Images used at the time of deep learning (for example, images that have received a high evaluation such as "like") preferably receive an evaluation of "like" from a number of people. Also, the given evaluation value mentioned above may be determined by proportion of people who have given an evaluation of "like" with respect to people who have accessed the image so as to view it (for example, 90%). Also, in the event that the given evaluation value mentioned above is determined by proportion, since reliability is lowered if a population parameter of the proportion is small, it may be made possible to determine as a predetermined value if the population parameter is greater than or equal to a given number of accesses (for example, 5 or more accesses). There may also be situations where even if the proportion of people who have evaluated as "like" is high, only people such as friends have evaluated as "like". For this reason evaluations of "like" from people who are not acquaintances may be given greater weight than evaluations from friends. For example, evaluations of "like" from people who are not acquaintances may be counted (with evaluations of acquaintances ignored), and this count value compared with a given value. Whether or not the people evaluating are acquaintances may be determined based on information relating to followers etc.

Also, if deep learning is carried out with images that have been evaluated with "like" as training data (correct), there is a possibility of it not being possible to detect differences from images that have not had an evaluation of "like". Deep learning may therefore be carried out with images that have not been evaluated as "like" as training data (correct) also. If it is not possible to input a lot of images, it might not be possible to find feature amounts that are common to images that have been evaluated as "like", and it might not be possible to perform effective deep learning. It is therefore preferable to have the image database 21 include a large number of images that can be evaluated, and make it possible to differentiate between a case where there is an evaluation of "like", and a case where there is not an evaluation of "like".

Also, a learning method at this time may differ depending on what type of inference engine is used. For example, if learning is performed after having performed scene determination (or theme determination) using a face detection function, and color and distance information, an inference engine may be used such that a specified viewer or third party evaluator might consider "liking" that scene. However, in that case, there is also a possibility that it will be necessary to switch an inference engine for each scene, and devices, device circuits, and system structure become complicated. Even if a scene is not determined, however, it is possible to simplify the structure of the system, etc., in the following types of situations. Specifically, even with dedicated technical devices, there may be cases where it is no longer necessary to considering the specific purpose. Also, if there are viewers who have been classified as a specified category or demographic, there are cases where the same preferences are exhibited regardless of circumstances, and at this time it is possible to omit scene determination, etc. For example, there are also viewers whose preference is to evaluate highly if use of color in an image is good, or evaluate highly if an image is intricate, regardless of image theme and/or regardless of the profile of the third party evaluator.

In this way, although training data to be learned changes in accordance with conditions and devices, training images may generally be set as described in the following. It should be noted that for reflecting results of scene determination, it is better to have images in the database associated with scene type, and it may be possible to have devices perform categorization by making a method of scene determination conform to database classification. In order to perform this, information on a method of classification for scene determination by the database may be acquired. Also, the extent to which such strict matching of scenes is necessary is modifiable depending on recommended specifications. As long as it is simple classification such as scenery or people, etc., such classification may be attached as conditions for when selecting images from the database at the time of learning, and may be then applied when retrieving images to be used as training data.

In this way, linkage with an image DB is preferably such that similar theme classifications and profile classifications are possible. Also, in order to classify a plurality of training data groups (i.e., sets of image data) for machine learning, it is possible to provide profile classification information for third parties who comment on images included in the DB, or theme classification information included in the image DB, in an external device. Also, the learning device may be provided with learning complete models that have already performed learning with first and second training data groups in order to identify how an acquired image is classified. In this case, acquired images may be through images that have been acquired by the imaging section, and/or may be stored images that have been stored in the storage section. With images that have already been stored also, when it is desired to receive evaluation from a third party, there is a request indicating a desire to receive evaluation using the learning device.

The image database is preferably an image database having the following image groups. The above described image group is extracted from among a plurality of images managed by this image DB, with conditions that they are images that people matching a specified profile have evaluated, and the results of this extraction can be provided as a first training data group for machine learning. Also, an image group other than the above-described first training data may be extracted, and the results of this extraction may be provided as a second training data group for machine learning. It goes without saying that, as required, other training data may be provided, and for more technical machine learning, these first and second training data groups should further be selectable using theme. Also, the first and second training data groups may further be images that have been evaluated by third parties that match a profile for a specified target, and images that have not been evaluated. Also, the first and second training data groups may further be images that have been evaluated by third parties that match a profile for a specified target, and images that have been evaluated by third parties that do not match a profile. Also, the image DB may be able to provide profile classification information and/or theme classification information for classifying the first and second training data groups for machine learning.

It is preferable to perform learning using a learning matrix (population) that satisfies the above type of conditions. Here, a description will be given with an example of a simple comment such as "like". However, with comments such as "really like", and "would like if it was just a little better" it is possible to give the first of these a numerical value score as more affirmative than "like", and to give the second a numerical value score by subtracting a little from "like." Further, assuming the case where the same evaluator evaluates a plurality of images, it may introduce an evaluation quantification such that which image is being evaluated, etc., is determined from text or the like, and one evaluation among a plurality of images being set high, and another evaluation being set low.

Also, description is given here of examples of general camera user reactions on a network. However, examples are not limited to general camera users, and cases such as evaluation by a specialist may also be handled, and in this case, there are many instances in which comments are text indicating more specific matters. In a case where there are one particular image and another particular image (the two do not necessarily have similar content) and it is possible to determine which image is evaluated high, etc., by a specialist as a result of comparison, it is also possible to relatively set these images to high evaluation and low evaluation similarly to as described earlier. In this way, with the inference model of this embodiment, images that have been acquired are input, images that have been evaluated by third parties who conform to a profile are extracted from among a plurality of images that have been managed by a specified image database in accordance with profile information of third parties who evaluate images stored externally, this group of images that has been extracted is made into a training data group. The inference model is created by performing machine learning using the training data group. If inference is performed on images that have been acquired using the inference model, evaluations as to whether or not these acquired images are similar to images of the training data group than images that are not of the training data group are output. This inference model can evaluate, for example, whether the input image is close to an image that has been evaluated by a French girl in her 20s or to an image that has not been evaluated by a French girl in her 20s. It should be noted that the acquired images may be through images that have been acquired by the imaging section, and may be already stored images that are stored in the storage section. It is also possible to respectively assign a numerical value for evaluation result as a score to images that have been initially acquired and also images that have been acquired after having been subjected to changes in acquisition conditions, so as to be able to determine evaluation improvement by comparing respective values.

Figure 3:
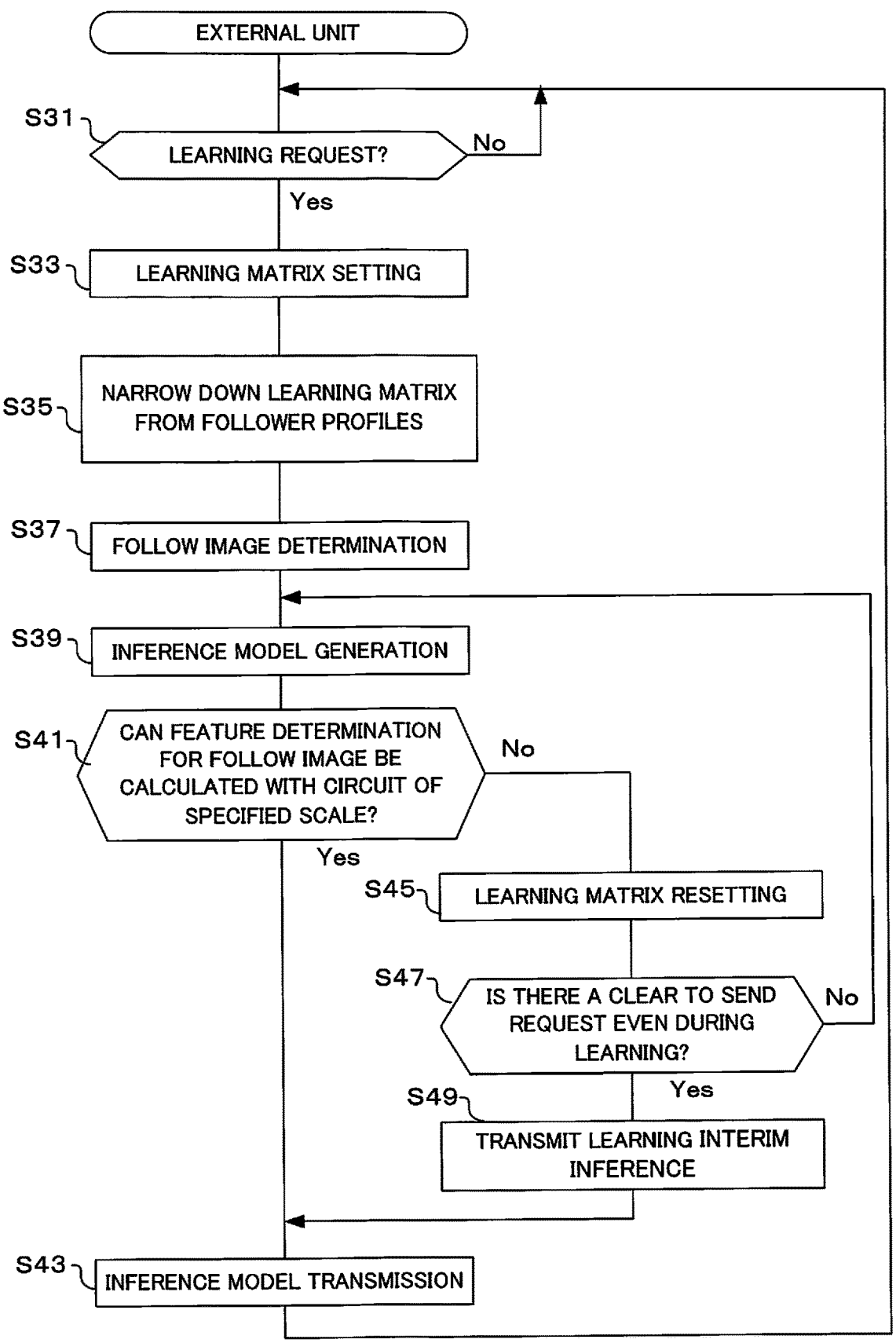
FIG. 3 is a flowchart showing operation of an external unit of the learning system of the first embodiment of the present invention.

Also, in a case where a reliable inference model has been generated in a range of image data for which deep learning has been determined, this learning section outputs the inference model as a "learning interim inference model" (refer, for example, to S41 and S45 to S49 in FIG. 3). If this reliability is represented as numerical data, it is possible to widen the range of application at the time of image determination, as shown in the following. A learning method can be proposed in which there is a step of acquiring requests that include profiles of third parties that will evaluate images that have been acquired, in accordance with this profile information a group of the images are extracted from among a plurality of images that have been managed by a specified image database under conditions such as images that have been evaluated by third parties that conform to the profile, as a first training data group, a group of images other than the first training data (it is not so strictly necessary to classify the images into either the first or the second training data) are extracted from among an image group contained in the specified image database as a second training data group, and an inference model that is capable of identifying a plurality of training data that have been classified in this way is created. This is the generation of an inference model that is capable of identifying in which data group an image that is included in the first and second training data groups belongs, but in a case where it is not possible to completely classify with the above described training data it is possible to have a scheme whereby classification specifications are adjusted as described previously and some are removed from the training data, to improve accuracy of the classification of included images. It may also be made possible for whether or not an image is classified as close to this first training data to be a numerical determination such that the level of evaluation, namely high and low, can be output quantitatively, and the evaluation values get to be compared with a specified threshold value, to then determine that the image is close to the first training data if the evaluation value exceeds the threshold value. Also, in a case where images that have been acquired are images that have been classified in specified themes, a first training data group may be extracted on the basis of an image group that is equivalent to a theme in a specified image database. Also, the specified image database may also contain images that have been evaluated by a person of a demographic that does not correspond to a profile that has been requested.

This learning section 25 also generates image data that will constitute a population based on requests, from image data that has been stored in the image database (refer, for example, to the population creation section 27, and to S33 in FIG. 3). The learning section also generates advice information in order to shoot images that match an inference model (refer, for example, to the guidance information 33 in FIG. 5A, and to S127 and S135 in FIG. 8B). The advice information is advice for shooting images that are likely to receive a high evaluation from a third party. It may be made possible to determine high and low evaluations quantitatively, and in cases where it appears evaluation will become low, and in cases where evaluation would be improved, advice display may be performed. That is, a value representing high and low evaluation is provisionally stored, changes to various image processing and shooting parameters for the image, and trimming etc., are performed, the image input to the inference engine is changed, and a case such as where evaluation is improved is determined by whether or not a value representing high and low evaluation becomes larger than the provisionally stored value. Advice is generated by the inference engine using the inference models, and the advice is provided to the user as displayed suggestions. Specifically, an inference engine used for advice display involves acquiring a user request that contains profile(s) of people who will evaluate acquired images (e.g., young French girls), and performing learning using a training data group that has been classified using conditions such as images that have been evaluated by a person conforming to a profile. It can therefore also be termed an inference engine for advice that can determine whether or not it appears possible to receive high evaluations on a similar basis for images that have been corrected or adjusted also. In this way, it is possible to put to practical use as an inference engine that is capable of output in order to determine improvement of evaluation as a result of having input images for which acquisition conditions for images that have been acquired have been changed. In a case where it is predicted that images that have been subjected to through image (also referred to as "Live View" image) display will, or will not, be evaluated high by the target third party as a result of inference by the inference engine, and this information may be provide to the user as advice. Such advice may also include special image processing (e.g., black and white versus enhanced or saturated colors, blurred versus wide depth of view focus, etc.) to be performed in order to get a good review from the target third party. Shooting can be performed by the photographer referencing this advice.

The learning section 25 retrieves data that matches a request from the image database 21 and that includes evaluation information that is different to a subjective evaluation for each data. The learning section 25 functions as a machine learning processor that performs deep learning using this extracted data group, and outputs a subjective evaluation prediction inference model (e.g., weights of a trained neural network) (refer, for example, to S39 in FIG. 3). Details of subjective evaluation will be described later, but in summary, subjective evaluation is evaluation such as where it is not possible to objectively determine in a logical manner, and/or where overall evaluation is not possible because various factors interact in a complicated manner. Also, this machine learning processor may respectively extract groups of data for which a value representing evaluation is higher than a given value and groups of data for which a value representing evaluation is lower than a given value from within the database, performs deep learning, and outputs inference models.

The communication section 26 has a communication circuit (has a reception circuit and/or a transmission circuit), and performs transmission and reception of data with the communication section 22 of the external image DB 21. The communication section 26 also performs transmission and reception of data with the communication section 14 of the camera 10. The communication section 26 functions as a reception circuit that receives requests indicating photographs intended by the user from the imaging device (refer, for example, to S31 in FIG. 3). The communication section 26 also functions as a transmission circuit that transmits inference models that have been output from the machine learning processor to the imaging device (refer, for example, to S43 and S49 in FIG. 3). This transmission circuit may also transmit advice information to the imaging device (refer, for example, to S151 in FIG. 8B). The communication section 26 functions as a transmission circuit that transmits inference models that have been output from the learning section to an external device (refer, for example, to S43 and S49 in FIG. 3).

The population creation section 27 creates an optimal population of training data (e.g., retrieved image data) based on requests that have been set by the setting section 16 of the camera, which will be described later. All image data may be used as it is as an optimum population. However, if the population is too large, extra time will be required for processing. Also, if the population is too large, there may be cases where there is "overfitting" during training, and reliability of the output inference model is lowered. It is therefore preferable to extract a population of training data of a suitable size from all image data using information such as nationality, gender, etc., that can be transmitted as accompanying information of an image.

For example, the external unit may create a population with processing as described in the following. (1) Creating a group of images that match the theme that the user wants, or that have been classified in a category that is close. (2) Next, from within that group of images, classifying and dividing images having good evaluation comments by separating from the rest of the images. At this time, some kind of quantitative evaluation may be performed. As the quantitative evaluation, it is preferable to have more information than simple "good" or "bad" binary evaluation, for example, number of comments, and weighting evaluation such as three stars or five stars, etc., is preferred. (3) Profiles of people who have commented are analyzed from handle names and nicknames attached to those comments, and images that have been given a good evaluation by third parties that conform to profiles that have been designated by the user, or profiles that are similar to those designated profiles, are further classified and divided. In order to perform learning such that affirmative comments will be output for images that have received a good evaluation by third party evaluators that the user would have expected with themes the user would want to shoot, learning input is performed with a group of such images as training data for which it is expected that a good evaluation will be issued, and a group of the other images as training data for which it is expected that affirmative comments will not be issued.

It should be noted that it is not necessary to carry out (1), (2) and (3) above in this order, and it is possible to change the order. For example, handle names may first be retrieved from profiles of third party evaluators that have been assumed by the user, then images that people with those handle names have evaluated as good are retrieved, and finally, among those retrieved images themes of images that the user wants to shoot may be retrieved. Also, not being limited to simply issuance of a good evaluation, in a case where a good evaluation can be expected to be received with change in shooting parameters etc., images that had the parameters modified are inputted into an already learned model for determining the difference of the results before and after the parameter change, and in a case where a good difference can be gained that may be taken as advice.

Figure 4:
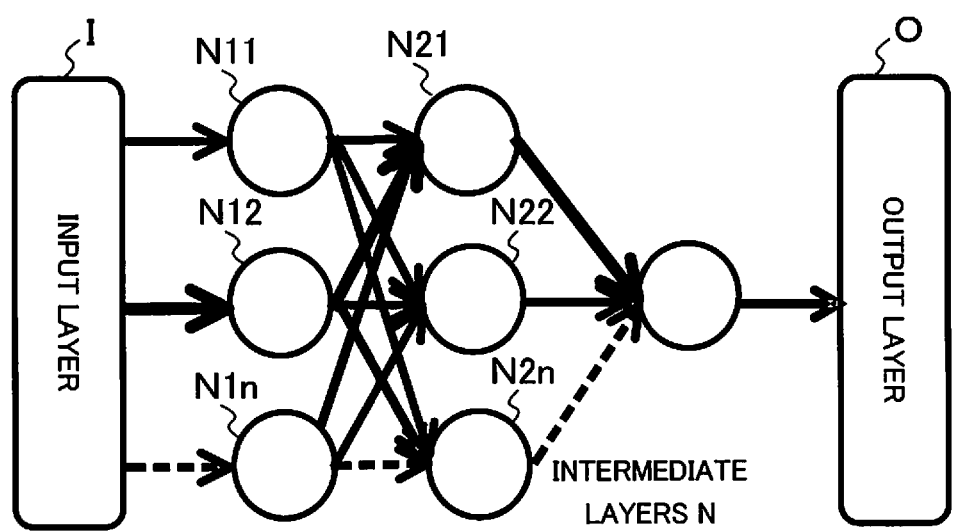
FIG. 4 is a block diagram showing a configuration for inference model formation in the learning system of the first embodiment of the present invention.

The input output modeling section 28 performs deep learning (machine learning) using so-called artificial intelligence (AI). Specifically, using an image data population that has been generated by the population creation section 27, the input output modeling section 28 generates one or more inference models for images that will satisfy requests that have been set by the setting section 16, by deep learning. The input output modeling section 28 has a configuration such as shown in FIG. 4. An input layer I is input with image data that has been created by the population creation section 27. Also, an output layer O provides image evaluation results, for example, training data (correct) such as "French girls in their twenties gave a high evaluation (evaluation of like)". An inference model is generated by calculating strength (weight) of connection between each of the neurons N11 to N2n, so that the input and output match.

It should be noted that if image data population is large, it will take a correspondingly long time until an inference model is completed as a result of deep learning (as long a time as months or years depending on the size of the population and on requests (conditions) that have been set by the setting section 16). Therefore, even if inference has not been completed for all image data of the population, in a case where a fixed level of reliability can be expected, an inference model that has been generated at that time may be output to the camera as a "learning interim inference model." Details of the deep learning will be described later using FIG. 4.

The control section 29 has a CPU (Central Processing Unit), peripheral circuits and a memory, etc., and the CPU controls each section within the learning section 25 in accordance with a program that has been stored in memory.

It should be noted that some or all of the peripheral circuits of the CPU within the control sections 17 and 19 may be implemented using a CPU (Central Processing Unit) and program code, may be implemented by circuits that are executed by program code such as a DSP (Digital Signal Processor), may use a hardware structure such as gate circuits that are generated based on a programming language described using Verilog, or may be executed using hardware circuits. Also, some functions of the CPU may be implemented by circuits that are executed by program code such as a DSP, may use a hardware structure such as gate circuits that are generated based on a programming language described using Verilog, or may be executed using hardware circuits.

Next, operation of this embodiment will be described using the flowcharts shown in FIG. 2 and FIG. 3.

Figure 2:
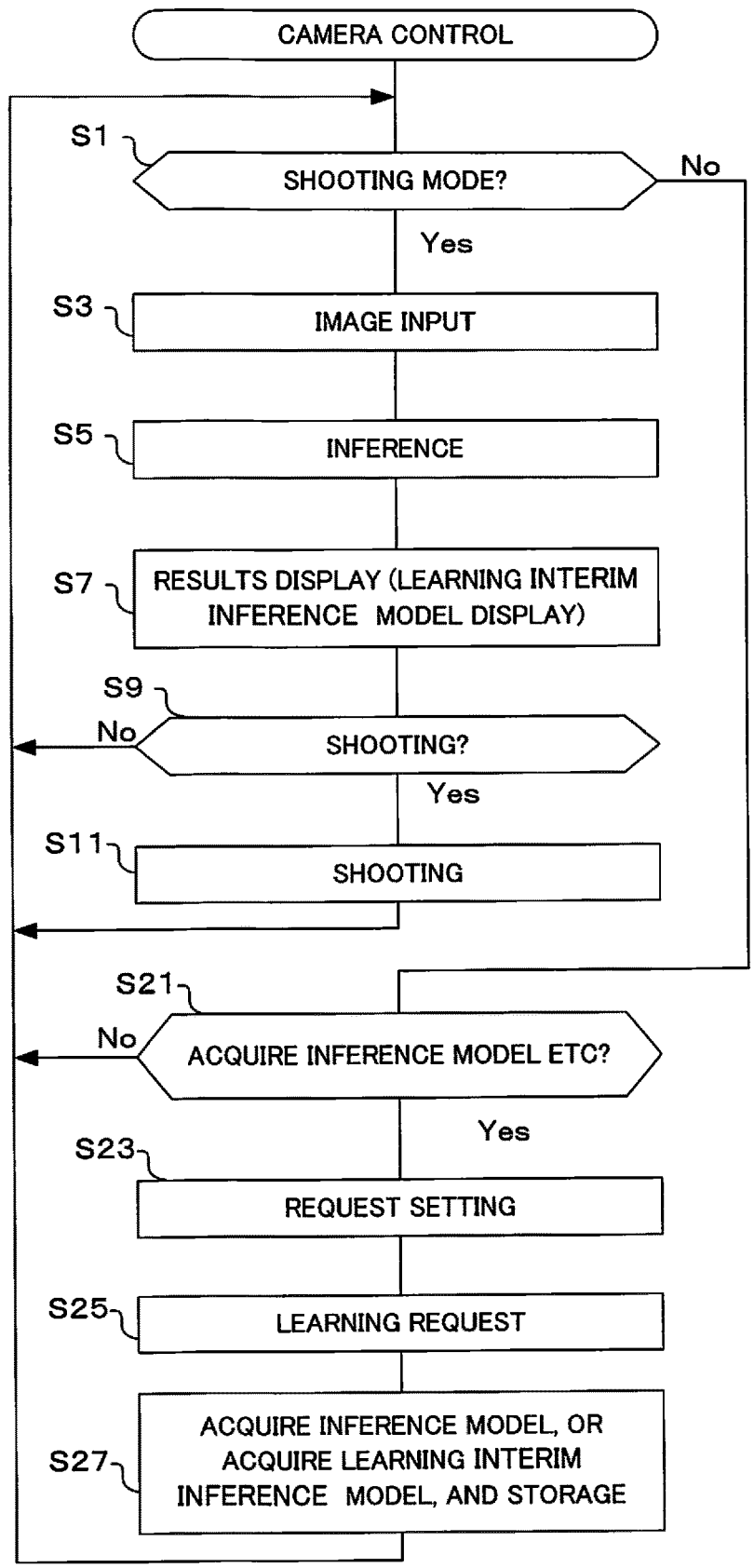
FIG. 2 is a flowchart showing operation of a camera of the learning system of the first embodiment of the present invention.

FIG. 2 shows operation on the camera 10, and the flowchart shown in FIG. 2 is executed by the control section 17 in accordance with a program that has been stored in memory. If the processing flow for camera control is entered, it is first determined whether or not the camera is in shooting mode (S1). In this flow, only two modes of the camera 10 will be described, namely a shooting mode and a learning mode. It is, however, also possible to execute other modes besides these two modes, such as playback mode. If learning mode has not been set using an operation member (not shown), it is determined to be shooting mode. It should be noted that learning mode is a mode in which the user requests generation of inference models to the learning section 25 using the setting section 16.

If the result of determination in step S1 is shooting mode, then image input is performed (S3). In this step the image input section 11 acquires image data. Through images are displayed on the display section 15 based on this image data that has been acquired.

If images have been input, next inference is performed (S5). Here, the inference engine 12 performs inference on image data that has been input, using an inference model (e.g., weights of the trained neural network) that has been generated by the input output modeling section 28 (acquired in step S27, which will be described later). The inference engine 12 is configured as shown in FIG. 4 that was described previously. The input layer I of this inference engine is input with image data that has been acquired by the image input section 11, and an inference model that is stored in the storage section 13 is set as strength (weight) of connections between each of the neurons N11 to N2n. Output from the output layer O of this inference engine 12 constitutes inference results.

If inference has been performed, next the inference results are displayed (S7). Here, the control section 17 displays inference results that were derived by the inference in step S5 on the display section 15. For example, if a request for the learning section 25 group includes accompanying information corresponding to "photographs that have received evaluation from French girls in their 20s", whether or not an image that was input in step S3 matched this request, that is, whether or not the image has received a third party evaluation ("like") a certain number of times or more, is displayed on the display section 15.

It should be noted that there may be cases where, without completion of deep learning for image data that has been initially set as a population for learning in the input output modeling section 28, a "learning interim inference model" is generated for a population of image data that has been set again, and transmitted to the camera 10, and the inference engine 12 performs inference using the learning interim inference model. In this case, display is performed so that it will be understood that an interim inference model was used. Also, in a case where a learning inference model is not suitable for an image that is currently being subjected to through image display, warning display, such as that inference is not possible, may be performed. Also, in the event that results of inference are that high evaluations are not obtained from third parties, advice display for shooting photographs that will obtain high evaluation may be performed.

If display of inference results has been carried out, it is next determined whether or not to perform shooting (S9) Here, the control section 17 performs determination based on whether or not the release button of the camera 10 has been pressed fully. When determining whether or to perform shooting, the user can reference display of the inference results of step S7. Shooting may also be carried out with reference to advice display. If the result of determination in this step is that imaging shooting (if the image is same as the previous one, the result will be same) will not be performed, processing returns to step S1 and the previous operations are executed.

If the result of determination in step S9 is to perform shooting, then shooting is executed (S11). Here, the control section 17 performs exposure control so as to achieve correct exposure, applies image processing for storage to image data that has been put by the image input section 11, and stores image data that has been subjected to image processing in a storage medium. If shooting has been performed, processing returns to step S1, and the previously described operations are executed.

Processing returns to step S1, and if the result of determination in this step is not shooting mode it is determined whether or not an inference model is to be acquired (S21). In a case where the user wants to shoot photographs that will receive a high evaluation ("like") by a third party, for example "photographs that will receive evaluation from French girls in their twenties", the user transmits a request that they have set with the setting section 16 to the learning section 25 within the external unit 20. An inference model is then returned to the camera 10 from the learning section 25, and the camera 10 displays whether or not a photograph will receive high evaluation by a third party evaluator using this inference model (refer to S7). In step S21, determination is for whether or not the user wishes to acquire this inference model. Since the user has set learning mode using a touch panel or an operation member, the control section 17 performs determination based on operating state of these sections. If the result of this determination is not to acquire the inference model, etc., processing returns to step S1 and the previously described operations are performed.

On the other hand, if the result of determination in step S21 is to acquire inference model, etc., next a request or the like is set (S23). In the event that the user requests deep learning to the learning section 25, a request is set in the setting section 16 in order to perform shooting in accordance with the user's desire. In this step, setting of these requests is carried out. As described previously, a request is an item (accompanying item) that is set in order to receive high evaluation from a third party. This accompanying item is a profile (also called "follower profile" or "target audience profile") of a third party, such as nationality, gender, age, etc., of an evaluating third party, and photograph theme, such as scenery, people, food, clothes, pets, etc. (these may be collectively referred to as "target profile"). As has been described previously, there are cases where scenes are handled as themes, and similarly there are cases where scenes and themes are handled as target profiles. It should be noted that the requests are not limited to follower profiles and themes, and may appropriately include conditions as long as they are conditions that represent photographs in line with the user's intention. Requests may also be set with an image itself that is as the user intends.

Next, learning is requested (S25). In this step a request that was set in step S23, specifically a request that was set with accompanying information such as nationality, gender and age, etc., is sent to the learning section 25 within the external unit 20 by means of the communication section 14. The learning section 25 that has received the request performs creation of an inference model. Specific inference model creation will be described later using the flowchart shown in FIG. 3. In summary, first the population creation section 27 extracts image data that will constitute a population based on target followers with the requests that have been received (refer to S33, S35 etc. in FIG. 3). Then the input output modeling section 28 creates an inference model using deep learning (refer to S37, S39 etc. in FIG. 3).

Also, in step S25, as was described previously, if it was possible to generate a reliable inference model even though deep learning was not completed for all image data, a request may be made to transmit this interim inference model (learning interim inference model).

If learning has been requested, next an inference model or learning interim inference model is acquired and stored (S27). As was described previously, if learning is requested from the camera side in step S25, the learning section 25 creates an inference model using deep learning. Once an inference model has been generated the external unit 20 transmits this inference model to the camera 10 (S43 in FIG. 3), and so in this step the inference model that has been received is stored in the storage section 13 as learning deliverables 13a.

Deep learning often takes a long time. However, even if deep learning is not completed for all images, the learning section 25 can generate an inference model (learning interim inference model) of high reliability to a certain extent with an image data population that has been set again (S41 and S45 in FIG. 3). If a request is issued in advance from the camera 10 to the learning section 25 to transmit a learning interim inference model if such an inference model has been generated (S23), then if an inference model of a certain high reliability (learning interim inference model) is generated, the learning section 25 transmits this learning interim inference model to the camera 10 (S49 in FIG. 3). The camera 10 acquires this learning interim inference model and stores it. Once the inference model etc. has been acquired and stored, processing returns to step S1 and the previously described operations are executed.

In this way, in the flow for camera control, the user sets a request (target profile and/or image theme), etc. (S23), this request is transmitted to the learning section 25 of the external unit 20 (S25), and an inference model is acquired from the learning section 25 (S27). Then, it is possible to evaluate an image using an inference model that was acquired during preparation for a shooting operation using this inference model (during through image display) (S5), and it is possible to acquire advice as to whether it will result in a photograph that the user intends (S7). Since an inference model that was used in deep learning is used, it is possible to perform determination that is based on massive amounts of data, and it is possible for the user to simply shoot a photograph as intended. If a target profile is appropriately set, it is possible to acquire images that are likely to receive a high evaluation by people belonging to the intended audience.

Also, regarding the inference model, even if deep learning has not been completed for all image data, as long as it is possible to produce an inference model having a given high reliability by performing deep learning using a given number of image data, it is possible to acquire this inference model as a "learning interim inference model" (S27), and use it (S5, S7). This means that after setting a target profile, etc., it is possible to acquire a learning interim inference model in a short time and perform inference using the inference engine 12.

Next, FIG. 3 shows operation of the external unit 20. The flowchart shown in FIG. 3 is executed by the control section 29 in accordance with a program that has been stored in memory. If the external unit control flow is started, it is first determined whether or not there is a learning request (S31).

As was described previously, in step S25 the camera 10 requests learning to the learning section 25 of the external unit 20 by means of the communication section 14. If the result of this determination is that there is not a learning request, a standby state is entered.

If the result of determination in step S31 is that there is a request for learning, setting of a learning matrix is performed (S33). All image data of the external image DB 21 and usable external image DBs may be used as a population for learning. However, in order to perform learning efficiently, here image data that will be a target of deep learning is retrieved from an external image database based on a request from the user, and a learning matrix data set is set.

The population of training data is then reduces using the target audience profile in the request (S35). There may be cases where profiles of third parties who have given a "like" evaluation for an image that is made a target at the time of deep learning are included in a request that has been set in the setting section 16. In this case, narrowing down of the population may be performed using target audience profiles. In the event that a target audience profile is not included in a request, images having a high evaluation are extracted based on accompanying information that is included in the request, and third party evaluator profiles for these images are acquired. If a third party evaluator profile is known, in this step narrowing down of the population for learning is performed using this information.

Determination of follow images is next carried out (S37). Here, the control section 29 determines whether or not there is an image that matches a request that has been set by the user in the setting section from within image data of the population, for example whether or not there is an image that has received a high evaluation from a third party evaluator (an image that has been evaluated as "like"). Images that have been determined to match a theme in this determination (follow images) are made input images for deep learning in the input output modeling section 28.

Next deep learning is performed and an inference model is generated (S39). Here the input output modeling section 28 performs deep learning on the population that has been set using follow images, and generates an inference model.

If generation of an inference model is commenced, it is determined whether or not it is possible to calculate feature determination for a follow image with a circuit of a specified scale (S41). Depending on size of the population, on the number and features of a follow image, and on circuit scale for carrying out deep learning, there may be cases where the time required for performing deep learning becomes quite long. Here, the control section 29 determines whether or not it is possible to complete calculation within a time that can normally be tolerated by the user as time for generating an inference model.

If the result of determination in step S41 is that calculation can be performed with a circuit of specified scale, an inference model is transmitted (S43). Here, if the input output modeling section 28 completes generation of the inference model using deep learning, this inference model that has been generated is transmitted to the camera 10 (refer to S27 in FIG. 2).

On the other hand, if the result of determination in step S41 is that calculation cannot be performed with a circuit of a specified scale, the learning matrix is reset (S45). Since the image data that will constitute the learning matrix is too much, the population creation section 27 once again changes and resets a population that will constitute objects of deep learning, using the request (accompanying information, etc.).

If resetting of the learning matrix has been performed, it is next determined whether or not there is a clear to send request, even during learning (S47). As was described previously, a lot of time is taken up by deep learning. Therefore, as was described previously, there may be cases where, if an inference model of a certain degree of high reliability is generated, the user requests transmission of this learning interim inference model (S25 in FIG. 2). In this step the control section 29 determines whether or not this request has been issued. If the result of determination in this step is that there is no transmission request, processing returns to step S39.

It should be noted that whether or not there is an inference model of a certain high level of reliability may be determination as to whether or not a LOSS value is lower than a threshold value. In a case where deep learning has been performed with an exercise that has been previously solved, a LOSS value is a difference between an inference result with an inference model that has been generated by deep learning and the previously known solution. What type of evaluation method is adopted by an inference model using deep learning will affect reliability of a learning device. With this embodiment the learning device evaluates using a LOSS value.

LOSS value is measured as described in summary in the following. As an image for reliability measurement, an image that is different from an image that was used in order to generate the inference model is prepared, and a LOSS value is measured using this image for reliability measurement. 100 images for reliability management that have been evaluated as "like" are input to an inference engine, and inference is performed using an inference model. In this case, obviously, if 100 images are evaluated as "like" then the inference results in a 100% match as "like" for the input images, and so LOSS value for the inference model at this time will be 0. On the other hand, if, among the same 100 input images there is an inference of "like" for 90 of those images, the loss value will become 100−90=10. Accordingly, LOSS value is a value that represents by how much a result that has been inferred is off (how incorrect the result will be). Specifically, it can be said to be an error in whether or not there is output as a correct solution. Content to be learned is changed and added, and a number of layers and connections between layers are adjusted so that LOSS value of the inference model approaches 0. LOSS value is measured, adjustment is performed so as to acquire a given result that is appropriate to achieving the aim, and learning deliverables acquired. It should be noted that using a LOSS value is not limiting, and another evaluation index may be used provided that if it is possible to evaluate reliability of an inference model.

On the other hand, if the result of determination in step S47 is that there is a transmission request, a learning interim inference model is transmitted to the camera 10 (S49). Here a learning matrix is set again, and since an inference model is generated with a certain high reliability in the range of this reset matrix, this learning interim inference model is transmitted to the camera 10. Deep learning for generating an inference model is performed even after the learning interim inference model has been transmitted, and if an inference model generated, this inference model is transmitted to the camera 10 (S43). It should be noted that in the event that a learning interim inference model has been transmitted, generation of the inference model may be completed. In this case step S43 is skipped and processing returns to step S31.

In this way in the control flow for the external unit, if a learning request is received, first a population is set from image data that is stored in an image database (S33). Images for input in order to perform deep learning using a request are then set (S37), deep learning is commenced, and generation of an inference model is performed (S39). An inference model is generated from among a massive number of image data using a request (accompanying information (target profile, follower profile, image theme etc.)) that has been set by the user. As a result it becomes easy to shoot photographs the user intends.

Also, depending on the number of items of image data of the population, number and features of images for input, and circuit scale of the input output modeling section 28 for deep learning, there may be cases where the deep learning takes a correspondingly long time. However even if it is not possible to perform deep learning for all image data that have been set as the population, as long as deep learning can be performed for a population of image data that has been set again, it is possible to generate an inference model of a reliability that satisfies the user as a learning interim inference model. With this embodiment as long as it is possible to generate this interim inference model, it is possible to transmit the learning interim inference model at that point in time.

Next, the structure of the input output modeling section 28 that performs deep learning will be described using FIG. 4. This input output modeling section 28 has intermediate layers (neurons) arranged between an input layer I and an output layer O. As the intermediate layers, a number of neurons N11 to N1n, N21 to N2n, . . . are arranged. The number of neuron layers is appropriately determined according to the design, and a number of neurons in each layer is also determined appropriately in accordance with the design.

Follow images that were set in step S37 are input to the input layer I, and training data (correct) is provided to the output layer O. When image data has been input to the input layer I, strengths (weights) between each of the neurons are determined by respective learning such that training data (correct) is output from the output layer O. As an inference model, each neuron, and strength (weight) of connection between each neuron that have been obtained by learning, are output. It should be noted that images input to the input layer I are narrowed down to groups of image data that satisfy a request (accompanying information), and as training data of the output layer O, high evaluations from a third party ("like" evaluation) may be supplied.

In this way, with the first embodiment of the present invention the user sets a request relating to photographs that they want in the camera 10, and the request is transmitted to a learning section 25 that is provided within an external unit 20. The learning section 25 selects a population of image data, the input output modeling section 28 performs deep learning, and an inference model corresponding to the user's request is generated and transmitted to the camera 10. The camera 10 evaluates images using the inference model that has been received. Generally, with deep learning a pre-learnt inference model is prepared, but with this embodiment an inference model is generated in accordance with the user's request. This means that it is possible to evaluate images using an inference model that corresponds to the user's individual conditions. Then, by taking into consideration evaluation results from the inference model it is possible for the user to easily perform shooting that is in line with the user's intention.

Also, with this embodiment, a receiving section (communication section 26) that receives a request from an external device is provided, data that meets that request and includes evaluation information (accompanying information) that is different to a subjective evaluation for each of the respective data is extracted from within a database, and deep learning is performed using this extracted data group. With this embodiment, expressions such as "like" by a third party with respect to posted images are used as evaluation information that is different to a subjective evaluation. However, evaluation information is not limited to "like", and any information can be adopted in this embodiment as long as it is information that represents a subjective evaluation by an evaluator for example, information representing a degree of liking by the evaluator (evaluation of level 1 to n)).

Subjective evaluations include an evaluation such as it is not possible to logically and objectively determine what is good or bad specifically, and/or evaluation such as that since there are various factors interacting in a complicated manner (multiplier effect), overall evaluation is not possible based on those factors alone even if some parts are logically explainable. The learning device of this embodiment performs learning such that determination results that include this subjective evaluation can be predicted. For this reason, the learning section 25 of the learning device receives requests that include subjective information to be referenced, and extracts data (images here) that matches this request, and that includes evaluation information that is different to a subjective evaluation corresponding to the request for every data item, from within a database. Deep learning is then performed using this data group that has been extracted, and an inference model that predicts subjective evaluation is output. If the inference model output from the learning section 25 is received by the external device and used, it is possible to shoot photographs reflecting a third party's reactions in advance, which was previously difficult for the user to realize or predict.

It should be noted that with this embodiment, inference has been performed using an inference model at the time of through image display before shooting. However, this is not limiting, and whether or not there are images that match a request may also be determined using an inference model at the time that already taken images are subjected to playback display. The result of this can be taken into consideration for determining whether or not to post those photographs to an external image DB. Also, if inference results from an inference model are constantly displayed during through image display, it is likely that the user will be unable to concentrate on the subject. Display may therefore be performed when there has been a request for inference results display from the user.

A second embodiment of the present invention will now be described using FIG. 5 to FIG. 8B. With the first embodiment, if the user sets a request deep learning was performed by the learning section 25 in response to that request, learning results (inference model) of this deep learning were returned to the camera, and evaluation of images was performed by the camera 10 using the learning results. Conversely, with the second embodiment, a plurality of inference models are generated in advance in the learning section 25, using a plurality of themes and/or follower profiles etc. The learning section 25 then selects the most appropriate inference model from among the plurality of inference models based on current conditions of the camera 10 (including shooting theme, etc.) and/or images etc. that are stored in the camera 10, and transmits the selected inference model to the camera 10.

Figure 5A:
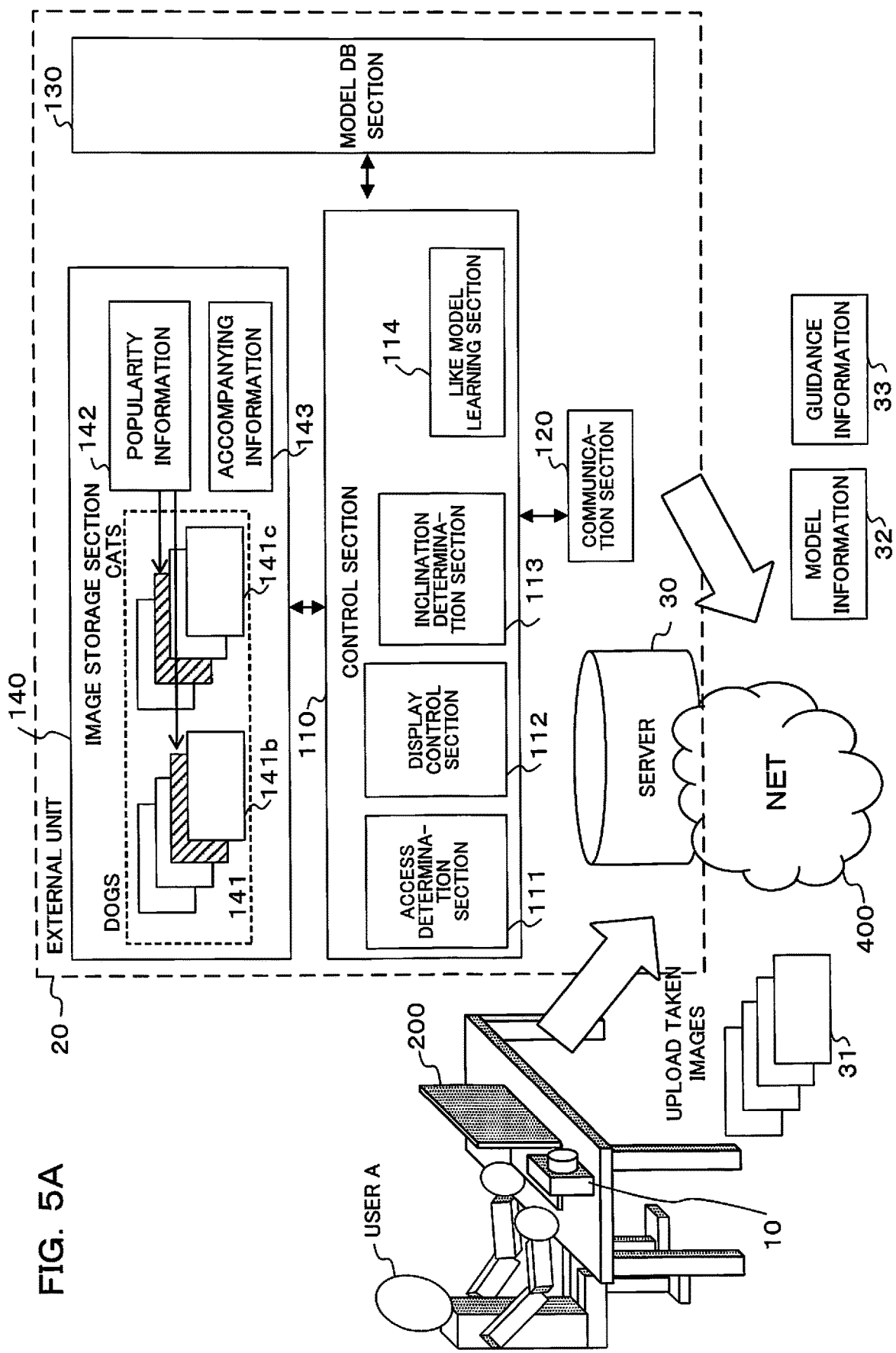
FIG. 5A is a block diagram of a learning system of a second embodiment of the present invention.
Figure 6:
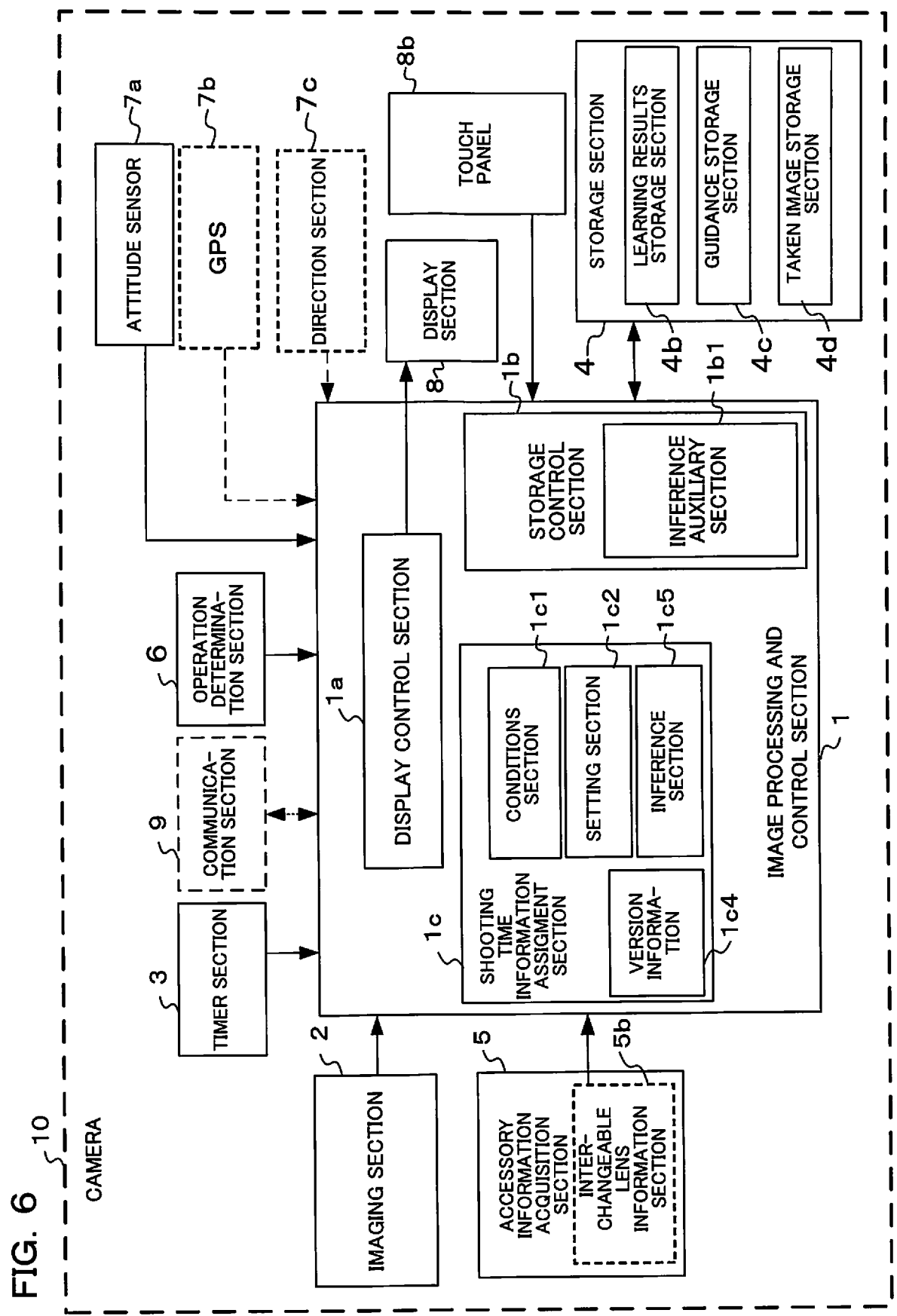
FIG. 6 is a block diagram of a camera of the learning system of the second embodiment of the present invention.

FIG. 5A is a block diagram mainly showing the electrical structure of a learning system of the second embodiment. This learning system also comprises a camera 10 and an external unit 20. Detail of the external unit 20 is shown in FIG. 5A, while detail of the camera 10 is shown in FIG. 6. The external unit 20 may be a public server for images managed by each operator. This server may publish images without restriction, and may restrict a publication range in a case of publishing to members only etc. An image storage section 140, model DB 130, and control section 110 may be arranged within the same unit, and third parties may cooperate with each other by means of communication. Also, a plurality of the image storage sections 140 may be provided, and the control section 110 may access a plurality of external image storage sections 140 by means of a communication section 120, to receive information relating to image data.

The external unit 20 comprises the control section 110, communication section 120, model database (model DB) 130, and image storage section 140. Each of the sections 110 to 140 within the external unit 20 may all be provided within a server 30, and some sections among each of the sections 110 to 140 within the external unit 20 may be provided within the server 30 while other sections may be provided in an external server etc.

An access determination section 111, display control section 112, inclination determination section 113, and like model learning section 114 are provided in the control section 110. The control section 110 has a CPU (Central Processing Unit), peripheral circuits and a memory etc., and the CPU controls each section of the external unit 20 in accordance with a program that has been stored in memory. Each of the sections 110 to 140 within the external unit 20 is realized mainly by a program, but some or all of these sections may be realized using hardware circuits.

Figure 8A:
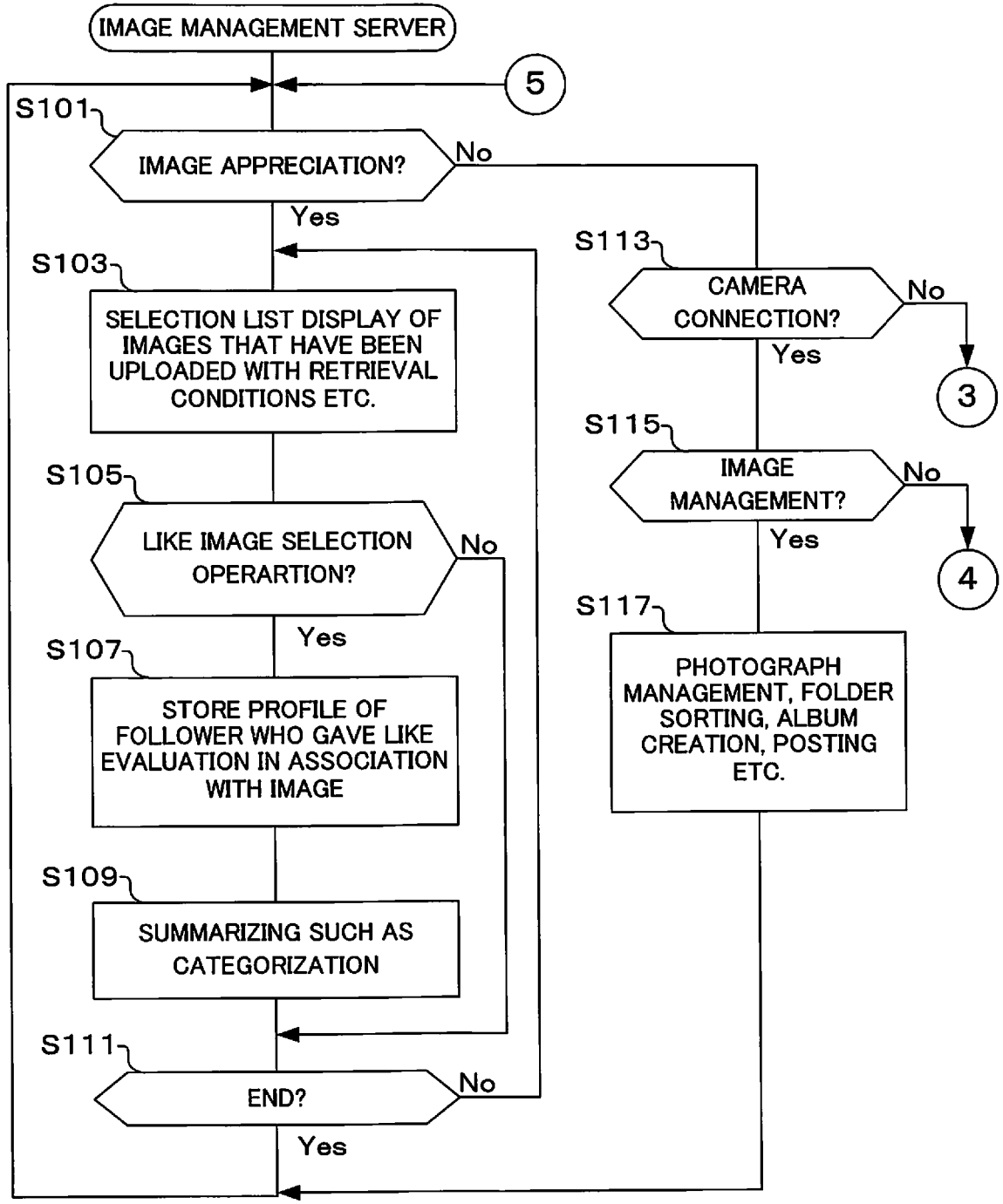
FIG. 8A and FIG. 8B are flowcharts showing operation of an image management server of the learning system of the second embodiment of the present invention.
Figure 8B:
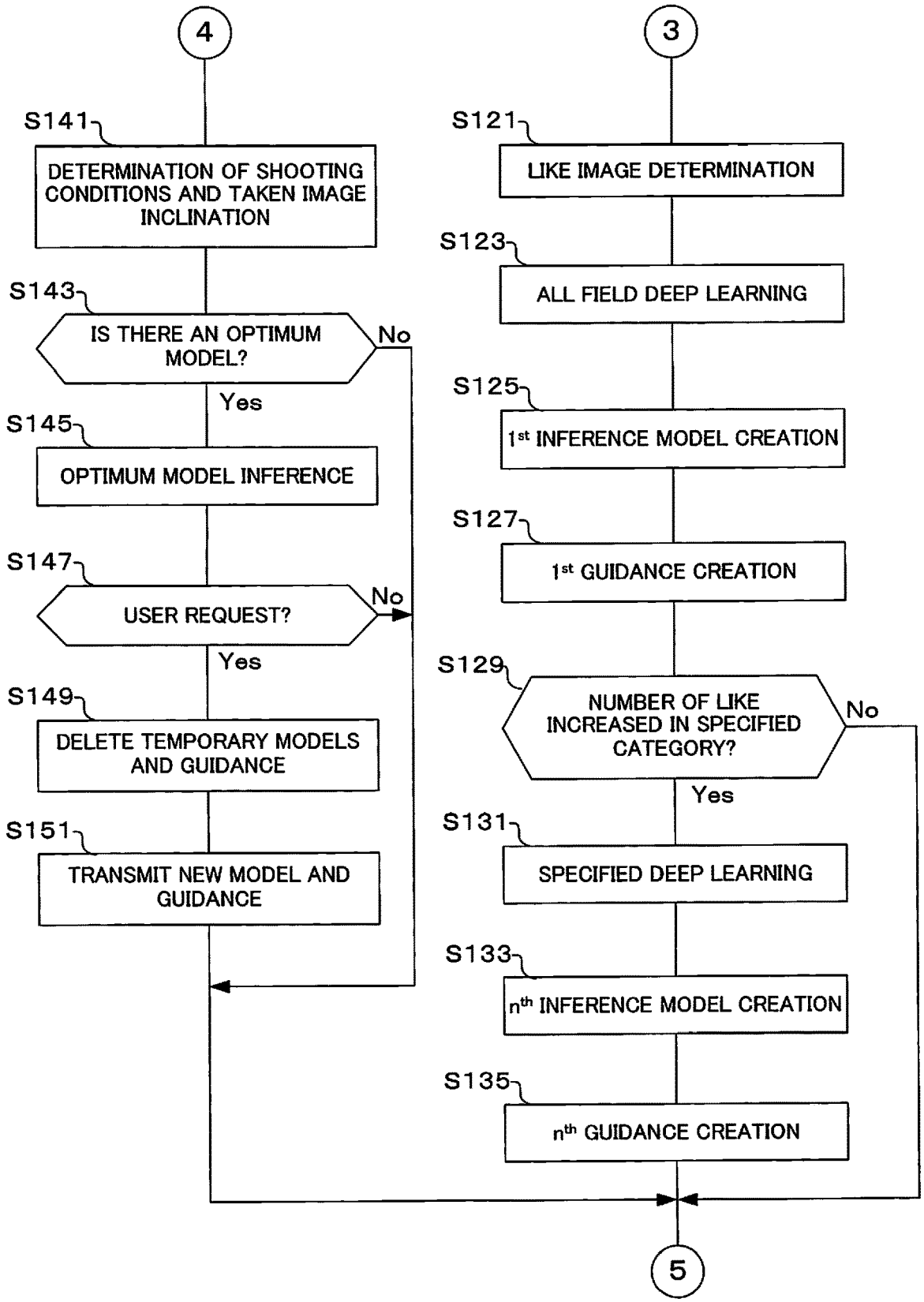

The control section 110 functions as a controller that selects an inference model that is optimal for the user from among a plurality of inference models based on shooting conditions and/or taken images (refer, for example, to S143 and S145 in FIG. 8B). This controller determines the user's inclination and selects an optimum inference model from shooting conditions of the imaging device and/or taken images based on the result of this determination (refer, for example, to the inclination determination section 113 and to S141 to S145 in FIG. 8B).

The access determination section 111 determines whether or not there has been access to the external unit 20 from a personal computer (PC) 200 that is used by a user A. The display control section 112 controls display at the time of displaying images that have been stored within the image storage section 140 on the PC 200, and at the time of displaying results that have been learned by the like model learning section 114 on the PC 200, etc.

The inclination determination section 113 analyzes image data that is stored in the camera 10 (or PC 200), and determines image preference of the user A. For example, inclination of taken images is determined from various viewpoints such as photographed object, position of photographed object, size of photographed object, shooting direction (whether it is sideways, a front view, shooting upwards, etc.), focal length at the time of shooting, exposure control values etc. Also, if image preference of the user A has been determined, the preference determination section 113 retrieves a like model that is closest to the inclination of the images of the user A from a $1^{st}$ like model to an $n^{th}$ like model stored in the model DB 13, and transmits this retrieved like model to the PC 200.

The like model learning section 114 comprises an input layer I, intermediate layers N11 to N2n, and an output layer O, as was shown in FIG. 4, and outputs inference models. Specifically, similarly to the previously described input output modeling section 28, the like model learning section 114 performs deep learning and generates an inference model for acquiring like images. As was described previously, like images are images that have been given a high evaluation such as "like" by a third party, among images that have been uploaded to the Internet or the like.

The like model learning section 114 also creates guide information 33. The guide information 33 is advice for increasing evaluation by third parties when it is predicted that evaluation by third parties will not be high, when performing through image display and display of inference results on the display section 8 of the camera 10. This guide information 33 issues instruction in accordance with difference between inference results and a through image. This guide information 33 may also be generated by deep learning. The guide information 33 may also be examples of images that have received a high evaluation from third parties (sample images).

Large images that are input for learning by the like model learning section 114 are acquired in association with information indicating evaluation for each image. This means that the like model learning section 114 camera also performs deep learning for differences in image quality, composition, expressions, and color cast etc. between images with a good evaluation and images with a bad evaluation. Machine learning may also be performed, noting specified relationships. For example if there are good evaluations and bad evaluations for the same types of image, making it possible to present those differences etc. results in simple guidance. In the case of images of through image display close to images with a bad evaluation, guide information that is valuable to the user can be obtained by simply displaying examples of images having a high evaluation with similar physical objects. Alternatively, if differences between images evaluated as good and bad are caused by differences in shooting parameters, or in performance of equipment that is used, presentation of those differences may also be guidance display. Also, if differences in evaluation are based on compositional differences, guidance display will comprise assist information for framing so that images of low evaluation approach images of high evaluation, so that there is no longer any difference.

This type of guidance display can be obtained by providing an inference engine such as described in the following in the like model learning section 114. For example, an inference engine for guidance may be obtained such that when a specified number of images that are known to have a low evaluation are input to the inference engine, and output of "some warning will be issued" is set, then 90% or more of the time gives a result of "some warning has been issued", as planned. Also, an inference engine for guidance may be created such that when a specified number of images that are known to have a high evaluation are input, and output of "some OK information will be issued" is set, then 80% or more of the time gives a result of ("some OK information"), as expected. These inference engines for guidance perform learning by taking a difference from such an ideal situation as a LOSS value.

The inference engine for guidance such as has been described above creates guide information 33. Depending on a physical object, when what should be ideal shooting is known, a difference from that ideal situation may be made guide information. In this case, an inference engine for physical object identification that detects what type of category a physical object falls into may be used together. Learning by means of creating an inference engine for identifying an object is such that in a case where there are 100 images of that specific physical object, 90 images thereof are determined, while when images of a non-applicable physical object have been input 90 of the 100 images are determined to be an inapplicable physical object. Specifically, learning is carried out with the intention of achieving a specified error (specified LOSS value). Physical objects are classified by this inference engine for identification, and differences between ideal shooting that has been retrieved from a database etc. in accordance with those physical object classification results, and current settings, may be presented. It should be noted that depending on conditions, the inference engine for guidance and the inference engine for physical object identification may be used for different purposes.

The like model learning section 114 functions as a machine learning processor that extracts images that have received a given evaluation from a third party from within an image database, performs deep learning using these images that have been extracted, and generates a plurality of inference models (refer to S123 to S135 in FIG. 8B). This machine learning processor carries out deep learning by extracting images that have received a given evaluation from a third party from within an image database of all fields regardless of classification (refer to S123 to S127 in FIG. 8B, for example). This machine learning processor performs deep learning for image data that belongs in a specified classification by extracting images that belong to the specified classification, if evaluation from a third party is greater than a given value (refer to S129 to S133 in FIG. 8B). It should be noted that since a number of evaluations from third parties varies significantly depending on the theme etc. of images constituting the subject of the user's request, the given value may be appropriately set in accordance with various circumstances, such as content of a request.

The communication section 120 has a communication circuit, and can perform communication with the PC 200 by means of a network 400. The camera 10 may also be connected to directly by means of communication. By means of the communication section 120 taken images 31 are acquired from the PC 200 (upload of taken images), and model information (inference model) 32 that has been generated by the like model learning section 114 may be transmitted to the PC 200. Guide information 33 for displaying advice in order to shoot images based on model information 32 may also be transmitted to the PC 200. The PC 200 that has received the model information 32 and the guide information 33 can output an inference model and guide information to the camera 10.

The communication section 120 functions as a reception circuit that receives requests indicating photographs intended by the user from the imaging device. The communication section 120 also functions as a transmission circuit that transmits inference models that have been output from the learning section to the imaging device (refer, for example, to S151 in FIG. 8B). This transmission circuit transmits advice information to the imaging device (refer, for example, to S151 in FIG. 8B). The communication section 120 functions as a reception circuit that receives shooting conditions of the imaging device and/or images that the user has taken from the imaging device (refer, for example, to S141 in FIG. 8B). The communication section 120 also functions as a transmission circuit that transmits an optimum inference model that has been selected by a selection section to the imaging device (refer, for example, to S151 in FIG. 8B).

The image storage section 140 is an image database (DB), and it is possible to store images that have been taken by many users, not just those of user A, in the image storage section 140. With the example shown in FIG. 5A, image data 141 is classified and divided into dog images 141b and cat images 141c, and many images are stored in the image storage section 140. Specifically, image data that is stored in the image database is classified and divided. Classification and division is an example, and there are various other classifications.

Popularity information 142 is associated with images among the respective images 141b and 141d that have "like" affixed. Also, in a case where shooting information (for example, EXIF (Exchangeable Image File Format) information etc.) etc. has been associated as accompanying information 143, and popularity information 142 has been associated, various information such as image poster information, profile information of people who have appended "like", follow information etc. is associated.

Figure 5B:
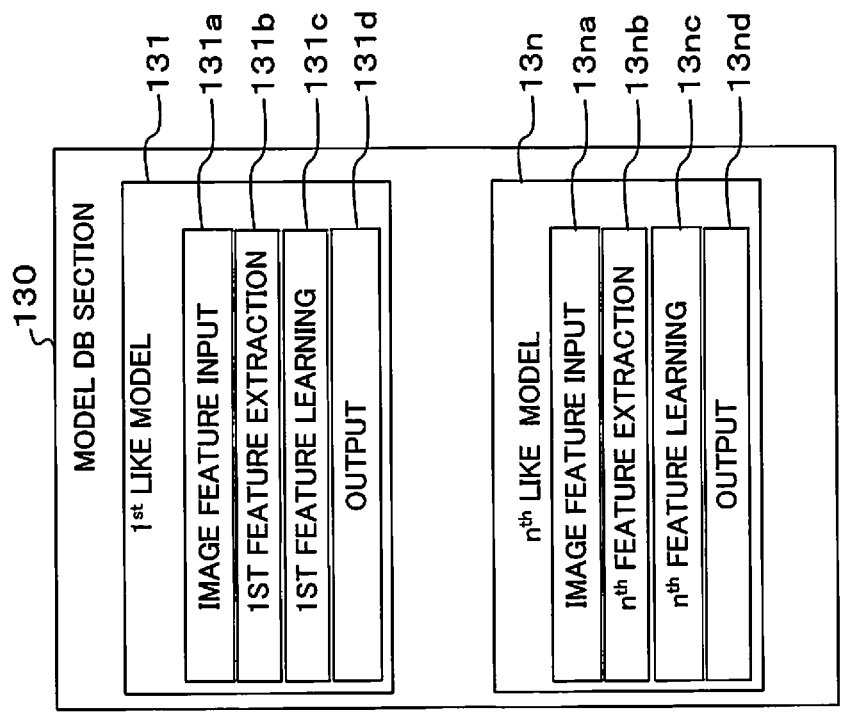
FIG. 5B is a diagram showing details of an example model DB section within the learning system.

A $1^{st}$ like model 131 to an $n^{th}$ like model 13n are stored in a model database (DB) 130 (referred to FIG. 5B). Like models that are stored in this model DB 13 are inference models that have already been learned by the like model learning section 114.

Image feature input 131a, $1^{st}$ feature extraction 131b, $1^{st}$ feature learning 131c and output 131d are stored in the $1^{st}$ like model 131. This $1^{st}$ like model 131 corresponds to the learning model that was shown in FIG. 4. The $1^{st}$ image feature input 131a is features of an image that have been input to the input layer I. The $1^{st}$ feature extraction 131b is information such as position, brightness, color, etc., of a pixel that has been extracted from within the image data that has been input to the input layer I. The $1^{st}$ feature learning 131c is strength (weights) of connection between each neuron. The output 131d stores results of deep learning. As was described previously, the inclination determination section 113 references inclination of images stored in the camera 100 of the user A, retrieves a like model that is close to user A's preference and recommended to the user A, and transmits this like model to the PC 200.

Next, the structure of the camera 10 will be described using FIG. 6. The camera 10 comprises an image processing and control section 1, an imaging section 2, a timer section 3, a memory 4, an accessory information acquisition section 5, an operation determination section 6, a sensor such as an attitude sensor 7a, a display section 8 and a communication section 9.

A display control section 1a, storage control section 1b, and shooting time information assignment section 1c are provided in the image processing and control section 1. The image processing and control section 1 has a CPU (Central Processing Unit), peripheral circuits and a memory etc., and the CPU carries out control of each section within the camera 10 in accordance with a program that has been stored in memory. Also, each of the sections 1a to 1c within the image processing and control section 1 is realized mainly by a program and peripheral circuits, but all of these sections may also be realized using peripheral circuits. The image processing and control section 1 also has an image processing circuit, and performs image processing on image data that has been input from the imaging section 2.

The display control section 1a performs display control when performing through image display, playback display, display of inference results, guidance display etc. on the display section 8. Through image display is movie display of a subject that is carried out based on image data from the imaging section 2. Playback display is displayed that is performed by reading out image data that has been stored in a taken image storage section within the memory 4. Display of inference results is display of results of inference that was carried out using an inference model that has been stored in the learning results storage section 4b. Guidance display is display of guidance that is stored in a guidance storage section 4c.

The storage control section 1b performs control of storage, such as storage of image data to the memory 4. Specifically, taken images are stored in a taken image storage section 4d. Also, an inference auxiliary section 1b1 stores model information (inference model) 32 that has been transmitted from the external unit 20 in a learning results storage section 4b, and stores guide information 33 in a guide storage section 4c. Also, in a case where advice is adopted when the camera 10 has performed inference using an inference model, these items of information are also stored (refer to S67 in FIG. 7).

The shooting time information assignment section 1c has a condition section 1c1, a setting section 1c2, version information 1c4, and an inference section 1c5. The condition section 1c acquires information that indicates various shooting conditions, such as shooting information of the camera 10, for example, focal length, focal position, exposure control values (aperture value, shutter speed value, ISO sensitivity value etc.), type of subject, size of subject, state of subject exposed to light, fitting/usage conditions of an accessory, etc.

The setting section 1c2, similarly to the setting section 16 of FIG. 2, sets request information that is associated with themes for which the user A wants to receive an evaluation of like. This request information that has been set is transmitted to the external unit 20 by means of the communication section 9. The like model learning section 114 of the external unit 20 performs deep learning based on this request information, and transmits an inference model of learning results to the camera 10. Also, features etc. of images at the time of this inference are stored in the model DB 13 as an $n^{th}$ that's nice model. The version information 1c4 is accessory version information of an interchangeable lens or the like, for example.

The inference section 1c5, similarly to the inference engine 12 of FIG. 2, performs inference using an inference model from the external unit 20. Results of inference performed during through image display are displayed on the display section 8. It becomes possible for the user A to shoot pictures in line with the intention that has been set by the setting section 1c2, by taking into consideration the inference results. The inference section 1c5 functions as an inference engine that determines whether or not image data that has been input by an image input section has been evaluated from a third party using an inference model that has been received by a receiving section (refer, for example, to S57 in FIG. 7A).

The imaging section 2, similarly to the image input section 11 of FIG. 2, has a photographing lens, image sensor, imaging control circuit, and image data processing circuit, etc., and generates image data of a subject. This image data is subjected to image processing in the image processing and control section 1. Also, the imaging section 2 outputs information such as angle of view and distance information of a photographing lens to the image processing and control section 1. These items of information are used when the condition section 1c determines shooting conditions. It should be noted that in a case where a photographing lens fitted to the camera 10 is an interchangeable lens, interchangeable lens information 5b may also be input.

The accessory information acquisition section 5 has the interchangeable lens information section 5b. The interchangeable lens information section 5b has focal length information, focal position information, aperture value information, and version information, etc., of the interchangeable lens. Besides interchangeable lens information there may also be camera accessory information, such as, for example, information on an attached strobe device. The accessory information acquisition section 5 transmits information that has been acquired to the image processing and control section 1. The condition section 1c determines conditions using the information that has been acquired also.

The timer section 3 has a clock function and a calendar function. Image data that has been output from the imaging section 2 has date and time information etc. associated with it.

The communication section 9 has a communication circuit, and can perform communication with the PC 200. By means of the communication section 9, the camera 10 transmits taken images to the external unit 20 either directly or indirectly, and receives model information 32 and guide information 33. The operation determination section 6 determines operating state of various operation members such as a release button, dial, operation button, etc., and determination results are output to the image processing and control section 1. The communication section 9 functions as a transmission circuit that transmits shooting conditions and/or images that have been stored in the image storage section to the learning device (refer, for example, to S81 in FIG. 7B). The communication section 9 functions as a reception circuit that receives an optimal inference model that has been selected from among inference models that have been generated by the learning device, based on shooting conditions and/or images that have been stored in the image storage section (refer, for example, to S87 in FIG. 7B).

The attitude sensor 7a may be an acceleration sensor, Gyro etc., and detects attitude of the camera 10. A GPS (Global Positioning System) 7b measures position of the camera 10 using a satellite navigation system. A direction sensor 7c has a compass, and detects direction in which the photographing lens of the camera 10 is facing. Outputs of the attitude sensor 7a, GPS 7b and direction sensor 7c are output to the image processing and control section 1, and the condition section 1c determines conditions of the camera 10 based on the sensor outputs. All of the attitude sensor 7a, GPS 7b and direction sensor 7c may be provided, but some of them may also be omitted.

The display section 8, similarly to the display section 15 of FIG. 2, has a display panel, and performs display based on image data that was acquired in the imaging section 2. The display section 8 also performs display of inference results of the inference section 1c5. The display section 8 may also perform display based on guide information that has been stored in the guide storage section 4c. The display section 8 may also perform display of requests that have been set in the setting section 1c2, as shown in FIG. 1B. A touch panel 8b is provided on the front surface of the display section 8, and detects the user A touching the display surface of the display section 8. Touch detection results are output to the image processing and control section 1.

The memory 4 has a learning results storage section 4b, guide storage section 4c, and taken image storage section 4d. The learning results storage section 4b stores results (inference models or learning interim inference models) that have been set by the setting section 1c2 and subjected to deep learning by the like model learning section 114. The learning results storage section 4b also stores learning results (inference models) that have been recommended by the inclination determination section 113 in accordance with conditions of the camera 10 that have been output by the condition section 1c1.

The guide storage section 4c stores guide information 33 that has been transmitted from the external unit 20. This guidance display is guidance display that constitutes reference to the user A, when executing an inference model that has been generated as a result of deep learning having been performed by the like model learning section 114. The guidance storage section 4c stores data for carrying out guidance display. As guidance display, besides advice at the time of the shooting operation, such as exposure control values and focal length etc., there may be sample images such as would receive an evaluation of "like".

It should be noted that some or all of the peripheral circuits of the CPU within the control section 110 and image processing and control section 1 may be implemented using a CPU (Central Processing Unit) and program code, may be implemented by circuits that are executed by program code such as a DSP (Digital Signal Processor), may use a hardware structure such as gate circuits that are generated based on a programming language described using Verilog, or may be executed using hardware circuits. Also, some functions of the CPU may be implemented by circuits that are executed by program code such as a DSP, may use a hardware structure such as gate circuits that are generated based on a programming language described using Verilog, or may be executed using hardware circuits.

Next, operation of the learning system of this embodiment will be described using the flowcharts shown in FIG. 7 to FIG. 8B.

Figure 7A:
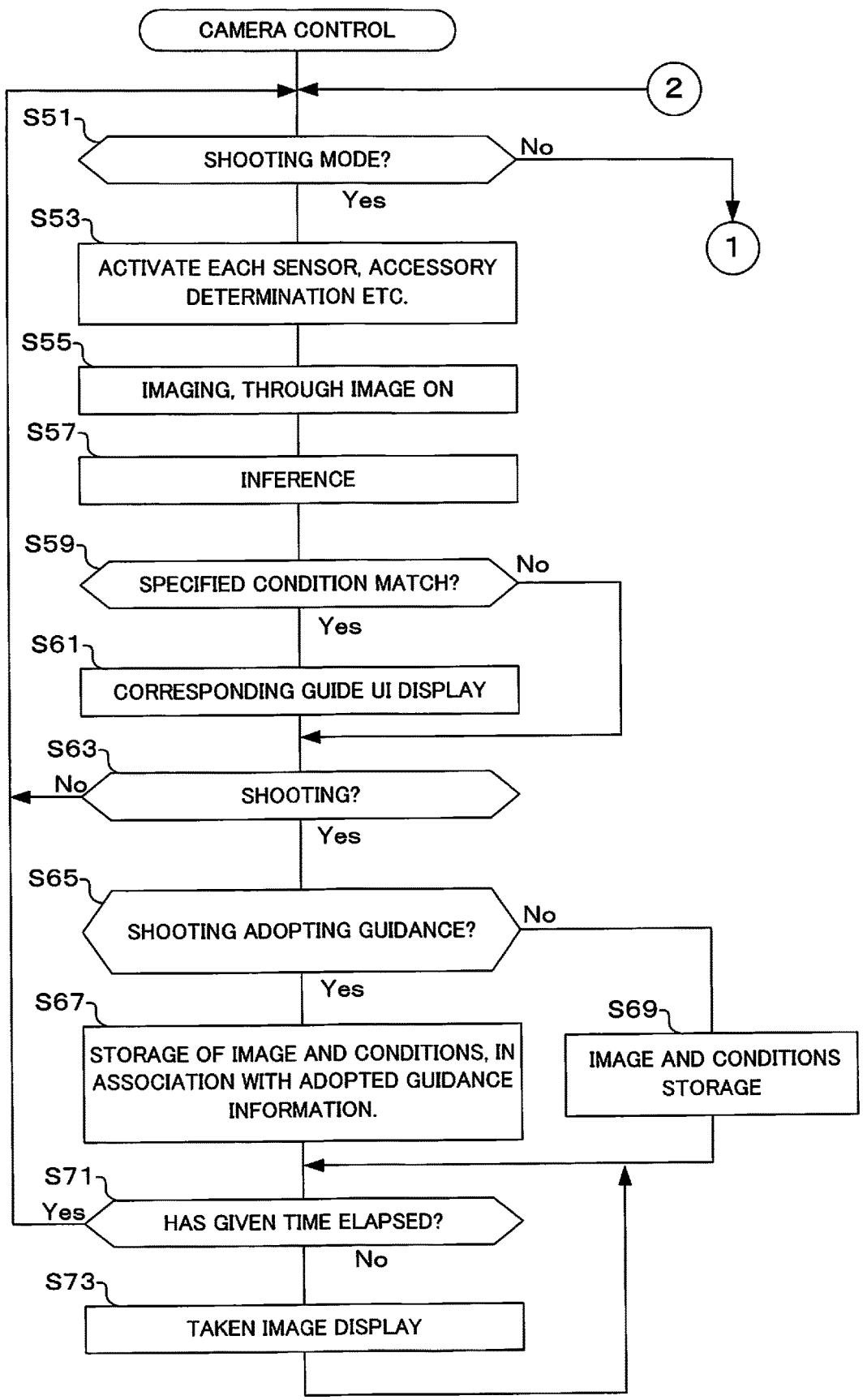
FIG. 7A and FIG. 7B are flowcharts showing operation of a camera of the learning system of the second embodiment of the present invention.
Figure 7B:
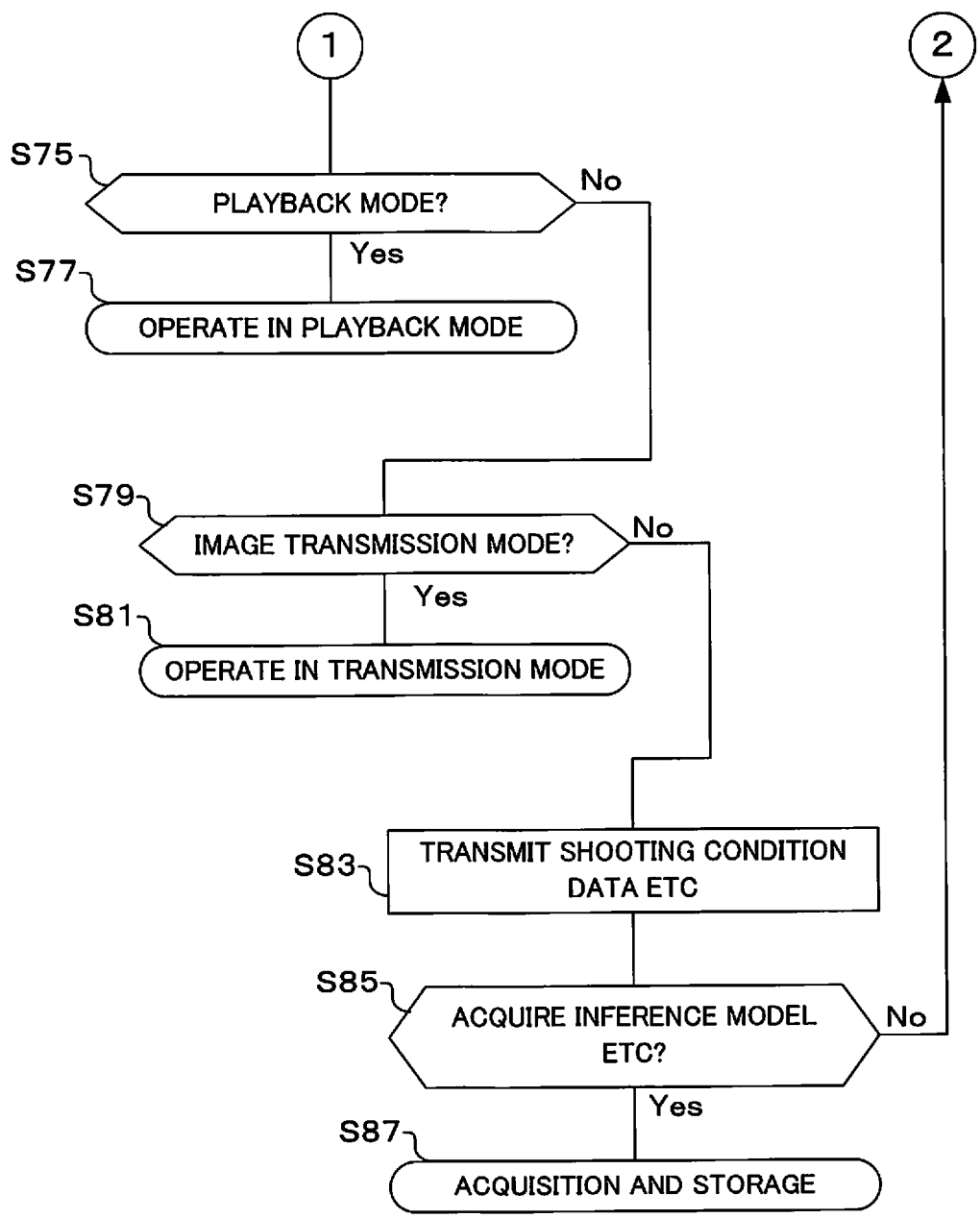

The flowcharts shown in FIG. 7A and FIG. 7B show operation of the camera 10, and these flowcharts are executed by the image processing and control section 1 in accordance with a program that has been stored in memory. If the processing flow for camera control is entered, it is first determined whether or not the camera is in shooting mode (S51). With this embodiment, shooting mode is the default mode and if another mode has not been set by an operation member or the like the image processing and control section 1 determines shooting mode.

If the result of determination in step S51 is shooting mode, next, various sensors are activated, and accessory determination is performed (S53). Here the image processing and control section 1 activates sensors such as the attitude sensor 7a, GPS 7b, and direction sensor 7c, and is input with sensor detection results. The image processing and control section 1 also determines whether or not an accessory (for example, an interchangeable lens) is attached to the camera 10, based on information from the accessory information acquisition section 5. Various information such as focal length is acquired from the interchangeable lens.

Next imaging is carried out, and a through image is displayed (S55). Here, the imaging section 2 acquires image data, the image processing and control section 1 forms image processing, and a through image is displayed on the display section 8.

Next, inference is performed (S57). As will be described later, since an inference model that has been generated by the like model learning section 114 is received from the external unit 20 (referred to S87), in this step the inference section 1c5 performs inference using the inference model that has been received. The inference here determines, for example whether or not, under a request (conditions) that has been set by the user A, there is a possibility of an image that is being subjected to through image display receiving a high evaluation (an evaluation of "like") from a third party.

If inference has been performed, it is next determined whether or not specified conditions are matched (S59). Here it is determined whether or not through image display or an accessory (for example, an interchangeable lens) matches specified conditions (request) that have been set by user A.

If the result of determination in step S59 is that specified conditions have been matched, corresponding guidance UI (User Interface) display is performed (S61). Here, in the event that result of inference by the inference section 1c5 is that it is expected that a high valuation (evaluation of "like") will be received from a third party, then together with a through image, the fact that "conditions that have been set by user A have been matched and there should be an evaluation of "like"" is displayed on the display section 8 together with the through image. Also, the meeting of the conditions might not be a perfect match. In this case, guidance display may be performed for shooting in order to achieve a perfect match.

On the other hand, if the result of determination in step S59 is that given conditions are not matched, it is not necessary to display this to the user. However, in the case where an evaluation of "like" is not likely, display may be formed based on guide information 33 stored in the guide storage section 4c. As guide information for this case, advice may be given so as to indicate what type of shooting will result in an evaluation of "like" in the case of this theme. For example, a difference between an image that will be evaluated as like and the current through image may be made the advice display. As another example, sample images that have been evaluated as "like" may also be displayed. That is, if the user is shooting a dog, but none if the user's through-images would likely be liked by the target user, the system may simply display previous images of dogs liked by the target user.

If corresponding guide UI display has been performed in step S61, or if the result of determination in step S59 is that specific conditions have not been matched, whether or not to perform shooting is determined (S63). Here, it is determined whether or not the release button of the camera 10 has been pressed fully. When determining whether or to perform shooting, the user A can reference the corresponding guide UI display of step S61. If the result of this determination is not shooting, processing returns to step S51 and the previously described operations are executed.

If the result of determination in step S63 is shooting, it is next determined whether or not to perform shooting by adopting advice (S65). If the user A will perform shooting in accordance with the corresponding guide UI display that has been displayed in step S61, display to that effect is performed using an operation member or a touch panel. Alternatively, in the event that it can be judged, based on outputs of various sensors and/or operating states of operation member etc., that aperture, shutter speed, shooting direction, focal length etc. have been performed in accordance with corresponding guide UI display, it may be determined that advice has been automatically adopted.

If the result of determination in step S65 is that advice has been adopted, the inference auxiliary section 1b1 stores an image, conditions at that time, and also adopted guidance information associated therewith, in the memory 4 (S67). In this case, an image and shooting conditions are stored, and advice that has been adopted (guide information) is stored in association with the image. By accumulating results as to whether or not advice has been assimilated, it is possible to determine advice that the user of the camera 10 likes and advice that they do not like. Advice that has not been adopted can be considered to have a content that is difficult for the user to assimilate. Since this type of unwanted advice is of no interest to that user, under similar conditions subsequently, the same advice should not be displayed. Customizing the advice in this way is suitable for an inference engine that determines sensitive and subjective elements. Even for adopted advice, displaying the same advice to some extent is bothersome to the user, and so should not be displayed more than a given number of times in order to avoid stressing the user. For example, setting of a learning matrix at the time of guidance learning may be performed to take into consideration adopted information, etc. An inference engine for guidance should perform learning by setting a LOSS value such that advice that is completely unacceptable to the user will never be output.

On the other hand, if the result of determination in step S65 is that advice has not been adopted, an image and conditions are stored (S69). By storing images and conditions for which advice has not been adopted it is possible to refer to them at the time of the next inference.

If storage has been performed in step S67 or step S69, it is next determined whether or not a given time has elapsed (S71). After shooting, it is determined whether or not a given time has elapsed, for example, whether or not a so-called Quickview Display time has elapsed. If the result of this determination is that a given time has not elapsed, an image that was taken in step S63 is displayed on the display section 8. On the other hand, if the result of determination is that a given time has elapsed, processing returns to step S51 and the previously described operations are executed.

Returning to step S51, if the result of this determination is not shooting mode, it is determined whether or not it is playback mode (S75). Playback mode is a mode for subjecting taken images that have been stored in the memory 4 to playback display on the display section 8. Playback mode is executed by the user A selecting playback mode by operating a playback button or the like. If the result of determination in this step is that playback mode has been selected, the image processing and control section 1 operates in playback mode (S77). Once playback mode is completed, processing returns to step S51.

If the result of determination in step S75 is not playback mode, it is determined whether or not it is image transmission mode (S79). Image transmission mode is a mode for transmitting a taken image 31 from the camera 10 to the external unit 20 by means of the PC 200. Image transmission mode is set by the user A operating an image transmission button or the like. If the result of determination in this step is that image transmission mode has been selected (refer to S113 in FIG. 8A), the image processing and control section 1 operates in transmission mode (S81). Once transmission mode is completed, processing returns to step S51.

If the result of determination in step S79 is not image transmission mode, shooting condition data etc. is transmitted (S83). If it is not image transmission mode it will become a remaining mode, namely, inference model acquisition mode. Here, information relating to shooting conditions collected by the condition section 1c1 and images being stored in the storage section is transmitted to the external unit 20 by means of the PC 200. The external unit 20 retrieves an inference model that is most suitable to the user A based on information relating to shooting conditions that have been received, and transmits this inference model to the camera 10. Retrieval of this optimum inference model will be described later using FIG. 8B.

If shooting condition data, etc., has been transmitted, it is determined whether or not an inference model etc. has been acquired (S85). As was described previously, the external unit 20 returns an optimum inference model based on information relating to shooting conditions.

If the result of determination in step S85 is that an inference engine etc. cannot be acquired, processing returns to step S51 and the previously described operations are executed. On the other hand, if an inference engine etc. has been acquired the inference model etc. that has been acquired is stored in the memory 4 (S87).

The flowcharts shown in FIG. 8A and FIG. 8B show operation of the external unit 20, and these flowcharts are executed by the control section 110 in accordance with a program that has been stored in memory. If the flow for the image management server is commenced, it is first determined whether or not there is image appreciation (S101). There may be cases where the user A wishes to appreciate (browse, or view) images that are stored in the image storage section 140 on the PC 200 or camera 10. In this case there may be accesses to that effect from the PC 200 etc. to the access determination section 111. At the time of access to the image management server, the PC 200 transmits image retrieval conditions etc.

If the result of determination in step S101 is image appreciation, images that have been uploaded with search conditions etc. are subjected to selection list display (S103). In this case, retrieval is performed from among images that are stored in the image storage section 140, in accordance with search conditions. If retrieval is completed, after making it possible to list display images that have been selected, the display control section 112 transmits data to the PC 200.

Next, it is determined whether or not there has been a selection operation for a like image (S105). If there is an image that the user A likes among the images that have been displayed on the display section 8, "like" is clicked and the fact that the image is liked is transmitted. Here it is determined whether or not user A has given an evaluation of "like".

If the result of determination beam step S105 is that there has been a selection operation for a like image, association of a profile of the person who selected like and the image is performed (S107). Here, a person who selected like (specifically, user A), a person who gave an evaluation of like (namely the person who posted the image that has been selected), and the image that has been selected, are associated with each other. Since there will be many cases where a specific person will give a like evaluation to images of the specific person, if the profile of the person who selected like and the profile of the person who gave a like evaluation are both stored, it is possible to speculate on a relationship between the two. That is, it is preferable for evaluations to have also taken in to consideration a relationship between the posting person and the person who gave the evaluation. Further, since there are people who give high evaluation for everything, and people who hardly ever give a high evaluation for anything, profile information may include such an evaluator's character. For example, an inference engine for shooting photographs of high evaluation by "young French girls" and an inference engine for shooting photographs of high evaluation by "young opinionated French girls" may be provided, and switched as required.

This type of profile can be easily classified by analyzing the speech and behavior of that person on SNS etc. that are recently becoming widespread. For example, besides general classifications such as men, women, old, young, generation, nationality, region of birth and religion, profile analysis is also possible from other aspects such as hobbies and preferences, and cultural and historical background, or categories which are subcultural and only communicated among enthusiasts, and degree of "nerdiness". That is, requests provided with this type of profile are also facilitated using this embodiment. For example, requests for vague indicators, that have been expressed using "subjective" speech, such as "images that Japanese animation fans will probably like", can also be satisfied.

Next, totaling, such as categorization, is performed (S109). In step S107 a relationship between each image and each evaluator is determined. There may be cases where images that have been evaluated as "like" are being evaluated by various people, and by analyzing these evaluations it will be understood what type of evaluation is received from people with what type of profile. Also, by analyzing evaluators and profiles of those evaluators it is possible to determine what type of classification image they give high evaluation to, or to determine what type of classification image they receive high evaluation for. Further, it can also be categorized what type of image people with this type of common profile have a tendency to like. Regarding the profiles here, besides the previously described categorization, vague human relationships are also taken into consideration, such as, broadly speaking, compatibility, sense of obligation and relation between evaluated and evaluating people. That is, it is also possible to perform inference for a request such as "images such that 20 year old French girls will react with "like" even for images that have been taken by a person not related to themselves", which is considered as lacking clear logic or for which degree of request content is vague and abstract. Such inference can be achieved since a circle of friends etc. of 20 year old French girls can be analyzed using SNS history etc., and it is possible to determine people who they don't seem to have a relationship with. Requests that estimate future tastes are also possible based on transition in SNS themes, and speech and behavior of charismatic preachers, fashion leaders, and future oriented artists etc. Specifically, it is possible to have requests such as "images of attire for which an evaluation of "like" will probably increase in summer in England next year".

Also, in addition to the above described evaluation factors, various photographic equipment information at the time of shooting, accessory information, date and time, position, angle of elevation, screen brightness, subject brightness, brightness and color distribution, subject to background distance information etc. are also evaluation factors. With this embodiment, shooting and images that tend to constitute themes on a network will be described as an example. However, shooting and images are not limiting, and it can also be applied to other information, for example, in an audio recorder there are speech frequency range, dynamic range, game, or data size etc. Thus, images that have various information associated therewith are effective as big data, and constitute effective training data as a population for learning. It goes without saying that images that have not been evaluated, although appreciation is possible under a similar environment and infrastructure, can be analyzed similarly to evaluated images, and categorized.

In step S109, the control section 110 performs classification etc. using information for which association was performed in step S107, as was described above. As image classifications there are focal length, focal position, aperture value, shutter speed value, photographing lens direction and flash unit usage at the time of shooting, based on information that has been attached to the image (for example, Exif information). Classification and division may also be by theme of a photograph, for example scenery, people, food etc., resulting from image analysis. Also, if a profile of a poster (photographer) is attached to an image, classification of division may also be performed by nationality, gender, age group etc. of the poster. Also, in the event that comments have been attached to an image, classification of division may be based on these comments.

If summarizing, such as categorization, has been performed, next it is determined whether or not operation flow of the management server has been completed (S111). Here the access determination section 111 determines whether or not an access from the user A is completed. If the result of this determination is not completed, processing returns to step S103 and the previously described operations are executed. On the other hand, if the result of this determination is completed, processing returns to step S101 and the previously described operations are executed.

If the result of determination in step S101 is not image appreciation, it is determined whether or not there is camera connection (S113). Here it is determined whether or not there is a direct connection from the camera 10, or a connection to the image management server via the PC 200.

If the result of determination in step S113 is that there is a camera connection, it is determined whether or not there is image adjustment (S115). Here it is determined whether taken images that are stored in the image storage section 140 are adjusted, or whether taken images are to be adjusted together with storage in the image storage section 140. Since the user A designates operation content when connected to the external unit 20, determination is based on this operation content.

If the result of determination in step S115 is image adjustment, processing for photo adjustment, folder sorting, album creation, posting, etc., is executed (S117). If the user A wants to have their images appreciated by a third party also, image posting is performed. It is also possible to create a community using SNS etc. for making an environment in which these types of posted images can be easily evaluated. As described previously, when evaluating images, it is preferable to perform an evaluation also taking into consideration interpersonal relationships of the evaluating person and the evaluated person, and at this time evaluations are stored together with the profile of user A. By storing profiles it is also possible to simply eliminate "like" as a greeting. However in cases where it is clear that the number of occurrences of "like" is a lot or a few even without eliminating this type of "like", it is possible to discriminate between images that will be subjectively evaluated and images that will not be subjectively evaluated. If photograph adjustments etc. has been performed in step S117, processing returns to step S101 and the previously described operations are executed.

If the result of determination in step S113 is that there is no camera connection, like image determination is performed (S121). Here, operations for generating an inference model are executed in steps S121 to S135, for a user who is capable of accessing the external unit 20. First, in this step, images that have received a high evaluation (evaluation of "like") from a third party are extracted from among images that are stored in the image storage section 140. These images are used as an input images (set into the input layer I) at the time of deep learning by the like model learning section 114.

If like image determination has been performed, next deep learning is performed for all fields (S123). Here, generally, deep learning for generating an inference model for images in order to be evaluated as "like" is performed. This deep learning involves adjusting strength and weights etc. of connections between neurons N11 to N2n of intermediate layers so that when images of all fields (population) have been input to the input layer I, like is output from the output layer O, as was described previously using FIG. 4. The strengths and weights of neuron connections of the intermediate layers that have been adjusted are the inference model. Also, when performing deep learning, shooting conditions are also reflected at the time of inference model creation. This is for using shooting conditions when recommending an optimum inference model (refer to S143).

If deep learning has been performed, a $1^{st}$ inference model is created (S125). Strengths and weights, etc., of neuron connections of the intermediate layers when deep learning has been completed are made a $1^{st}$ model, and this model is stored in a model DB section 130. It should be noted that this inference model is a versatile inference model, and in the event that an inference model that is suitable for a specified category is not generated this versatile inference model is transmitted to the external device.

If the $1^{st}$ inference model has been created, next, $1^{st}$ guidance is created (S127). If the $1^{st}$ inference model has been created, $1^{st}$ guidance information is created in order to make it possible to shoot photographs with this $1^{st}$ inference model. This $1^{st}$ guidance is created by detecting differences between images that have a given evaluation and images that do not have a given evaluation. Detection at this time may be detection of differences between using an inference model for learning in order to evaluate input images at the time of shooting and at the time of viewing, and using an inference model for learning which category an input image belongs to. In any event, an inference model may be created that has performed learning so as to detect differences between images that have been evaluated highly and images that have not been evaluated highly. With deep learning it is preferable to create guidance (advice) that includes up to features that are barely noticed by a person. As advice, various advice may be included, such as exposure control values (aperture value, shutter speed value ISO sensitivity), focal length, focal position, photographing lens direction, etc. There may also be sample photographs that can be taken with the $1^{st}$ model.

In steps S123 to S127 it is possible to create a general purpose inference model having high versatility (dictionary), and guidance. However, a customized inference model may be obtained by further narrowing down requests. That is, if there is a receiving section that receives such requests, a new dictionary is obtained by learning that uses a data group that has been selected from the requests. Data that includes evaluation information, which is different to subjective evaluation for each of the respective data items of these data groups, is collected from within a database, deep learning is performed using data groups that have been collected, and an inference model for subjective evaluation prediction that fits a new request is created. By transmitting an inference model that has been output from search learning to the external device, a customized inference model is obtained. To give an easily understandable example, the camera 10 may determine whether or not to use an $n^{th}$ inference model for results that have been inferred by the $1^{st}$ inference model, and output detailed guidance. Obviously both versatile, general guidance and specialized guidance may both be given. The user may arbitrarily determine which guidance to use, and results of that determination may be fedback in step S67 etc.

If $1^{st}$ guidance has been created, it is next determined whether or not the number of like in a specified category has increased (S129). For example, there may be cases where the number of like increases for "photographs that receive evaluation from French girls in their 20s". In this step, the number of likes is monitored for each category, and determination is based on this number. If the result of this determination is that the number of like in a specified category has not increased, processing returns to step S101 and the previous operations are executed.

If the result of determination in step S129 is that the number of like in a specified category has increased, deep learning is performed for a specified field (S131). Here, image data population is restricted for the specified category in which a number of like has increased, and deep learning is performed.

Once deep learning has been performed for the specified field, an nth model is created (S133). Strengths and weights etc. of neuron connections of the intermediate layers when deep learning has been completed are stored in the model DB section 130 as an $n^{th}$ model. It should be noted that a plurality of this inference model can be stored, and they are added sequentially in the order nth model, $n+1^{th}$ model, $n+2^{th}$ model, . . . .

If an $n^{th}$ model has been created, next $n^{th}$ guidance is created (S135). If the $n^{th}$ model ($n^{th}$ inference model) has been created, advice so as to be able to shoot photographs with this $n^{th}$ model is created. As advice, various advice may be included, such as exposure control values, focal length, focal position, photographing lens direction etc. There may also be sample photographs that can be taken with the $n^{th}$ model. If the $n^{th}$ guidance has been created, processing returns to step S101 and the previously described operations are executed.

Returning to step S115, if the result of determination in this step is that there was no image adjustment, inclination determination for shooting conditions and taken images is performed (S141). In step S83 (FIG. 7B), shooting conditions that were collected by the condition section 1c1 and taken images that are stored in the taken image storage section 4d are transmitted to the external unit 20. In this step, the preference determination section 113 determines preference of shooting conditions of the camera 10 and shooting preferences of the user A.

In this step S115 it is possible to determine whether or not the inference model currently being used by the user matches the photographer's inclination and tastes. For example, even if an inference model that detects faces of various animals is loaded, there may be cases where an inference engine that has been adapted for faces of insects would be better. Images that have been taken may be stored so as to be accordingly analyzed by taking into account cases where those stored images would be reflected in customized feature learning by determining the user's shooting preference (including observational purpose) and feeding back the preference. For example, image storage may be performed together with shooting parameters, and various ways of acquiring user's desires and preference information can be considered, such as by storing images in association with operation of the camera until shooting, voice shooting assistance, and results of framing analysis behavior that has been analyzed with through images. Also, information of categories of images that have been taken may be stored, not images themselves, and an approach may be devised such that it is possible to send the user's preferences. At the time of using a shooting device, optimizing an inference model from information on real usage history that has been obtained from the shooting device is preferable from a practical viewpoint. For example, if the shooting device is a camera, there are main categories, such as whether a photographed object is scenery, a person, an animal, a flower, or food, and further there are sub categories such as a night view, fireworks or a sunset or sunrise etc. for scenery as a main category. Also if the shooting device is inspection equipment there are categories such as is it simply detected whether or not there is a blemish or foreign matter, is detection performed until foreign matter is classified, and if the shooting device is medical, there are categories such as existence of a tumor, and determination of symptoms of that tumor. This category determination is preferably performed by a large-scale service system. However, if energy-saving design of a unit or device, and heating problems, portability, and space-saving accompanying this energy-saving design, are taken into consideration, it is not preferable to have countless inference models in accordance with all usage conditions.

Next it is determined whether or not there is an optimal model (S143). The inclination determination section 113 performs inclination determination in step S143. This preference determination detects a like model that has a high degree of match to image feature input, feature extraction, and feature learning etc. of the $1^{st}$ like model 131 and a like model of the $n^{th}$ model 13n etc., and this is made an optimal model. In this step it is determined whether or not there is an optimal model from within the model DB 13 that will be recommended to the user A.

If the result of determination in step S143 is that there is an optimal model, the optimal model is recommended (S145). Here, the model that was extracted in step S143 is set as the optimal model.

It is next determined whether or not there is a user request (S147). Here it is determined whether or not there has been an optimal model transmission request from the user A. It should be noted that in a case where shooting conditions etc. have been transmitted as a result of operation by the user A, it may automatically be determined that there is a user request.

If the result of determination in step S147 is that there is a user request, the former model and guidance are deleted (S149). Here, the former inference model and former guidance that were transmitted previously are deleted. The deletion of the former inference model etc., is because if energy-saving design, and heat generation problems, portability and space-saving accompanying the energy-saving design, are considered, the fact that there are countless inference models corresponding to all usage conditions is inappropriate for the design and manufacture of the unit or device. However, if the device is in a field where the above-mentioned problems are permissible, it is possible to omit this deletion. Since there is a possibility of causing contradiction due to excessive judgments, a scheme may be implemented to lower priority of an inference model.

Next, the new model and new guidance are transmitted (S151). The optimum model that was set in step S145 (new model) and the guidance that was created based on this optimum model are transmitted to the camera 10. In the camera 10, the inference model and guidance that have been received are stored, as was described previously (refer to S87).

If the new model and new guidance have been transmitted, or if the result of determination in step S143 is that there is not an optimal model, or if the result of determination in step S147 is that there is not a user request, processing returns to step S101 and the previously described operations are executed will.

In this way, with the second embodiment of the present invention the like model learning section 114 within the external unit 20 creates a plurality of inference models for images that will be evaluated as image, using images that have been evaluated as like among images that have been stored in an image storage section such as an image server (refer to S121 to S135 in FIG. 8B). Then, if shooting conditions and taken images have been transmitted from the user to the external unit 20 (refer to S83 in FIG. 7B), an optimum inference model is searched for based on shooting conditions and taken images (refer to S143 and S145 in FIG. 8B), and this optimum model is transmitted to the camera 10 (refer to S151 in FIG. 8B). Since the external unit 20 prepares a plurality of inference models in advance, if there is information such as shooting conditions from the camera 10 it is possible to return an optimum inference model rapidly.

Also, if a number of likes in a specified category is increased, deep learning is performed for that specified category and inference model is created (S129 to S135 in FIG. 8B). This means that it is possible to also present an inference model to users who have an interest in the specified field.

As has been described above, with the preferred embodiments of the present invention the learning device receives a request indicating photographs the user likes from the imaging device (refer, for example, to S31 in FIG. 3), extracts images that fit the request and that have received a given evaluation from a third party from within the image database, performs deep learning using the extracted images, and outputs on inference model (refer, for example, to S33 to S39 in FIG. 3). The learning device transmits the inference model that has been output to the imaging device (refer, for example, to S43 in FIG. 3). As a result it is possible to acquire information for simply shooting photographs that respect the intention from the user, and that will be evaluated from a third party. It should be noted that the third party may also be the user themselves. A learning device may also be a device such that an evaluation value is given to a result that has been selected by a specialist in a specified field.

With the preferred embodiments of the present invention the learning device extracts images, that have a given evaluation from a third party, from within an image database, performs deep learning using these images that have been extracted, and generates a plurality of inference models (refer to S121 to S135 in FIG. 8B). Also, the learning device receives requests indicating photographs the user likes and/or taken images of the user from the imaging device (refer, for example, to S141 in FIG. 8B), and based on the requests and/or taken images selects an inference model that is most appropriate to the user from among a plurality of inference models (refer, for example, to S143 to S145 in FIG. 8B). The learning device then transmits the optimum inference model that has been selected to the imaging device (refer, for example, to S151 in FIG. 8B). As a result it becomes possible for the learning device to obtain information for easily shooting photographs that will fit the shooting conditions and taken images of the imaging device, and that will be evaluated highly from a third party.

It should be noted that in the preferred embodiments of the present invention the following invention is also described. A learning device, comprising a reception circuit that receives requests indicating photographs the user likes from an external device, a machine learning processor that extracts images that match the requests and for which an evaluation from a third party is greater than a given value, from within an image database, performs deep learning using these images that have been extracted, and outputs an inference model, and a transmission circuit that transmits on inference model that has been output from the machine learning processor to the external device.

It should be noted that in the preferred embodiments of the present invention the following invention is also described. An imaging device that receives an inference model that has been generated by the previously described learning device, comprising image input that inputs image data, and an inference engine that performs inference on the image data using the inference model. Also, an imaging device that receives a learning interim inference model that has been generated by the previously described learning device, comprising image input that inputs image data, and an inference engine that performs inference on the image data using the learning interim inference model. Also, an imaging device that receives an inference model that has been generated by the previously described learning device, or receives a learning interim inference model, comprising a display that displays inference results from the inference section. Also, an imaging device that receives advice information, comprising a display that performs advice display based on image data that has been input by an image input section, and the advice information.

It should be noted that in the preferred embodiments of the present invention the following invention is also described. An imaging device, comprising a setting circuit that sets requests representing photographs a user likes, a transmission circuit that transmits the requests that have been set by the setting circuit to a learning device, and a reception circuit that receives an inference model that has been generated by the learning device from the learning device, on the basis of an image database and the requests. Also, the previously described imaging device, further comprises an inference engine that determines whether or not image data that has been input using image input has been subjected to evaluation from a third party, using inference models that have been received by the reception circuit, and a display that displays inference results from the inference section. Also, an imaging device, comprising a transmission circuit that transmits shooting conditions and/or images that have been stored in an image storage to a learning device, and a reception circuit that receives an optimal inference model that has been selected from among inference models that have been generated by the learning device, based on shooting conditions and/or images that have been stored in the image storage. Also, the previously described imaging device, further comprising an inference engine that determines whether or not image data that has been input using image input has been subjected to evaluation from a third party, using the inference model that has been received by the reception circuit, and a display that displays inference results from the inference engine.

Also, in the preferred embodiments of the present invention, the following invention is also described. A learning method comprising the following steps: a step of inputting specified theme information and specified profile information, (1) creating a group of images that conform to a theme the user likes, or have been classified in a category that is close, (2) then classifying as images that have a good evaluation comment from within the group of images, and other images, and (3) analyzing profiles of people who have commented from information relating to contributors of the comments, further classifying images that conform to a profile the user has designated, or that have received a good evaluation from a person of a similar profile, and making this group of images that have been classified training data.

Also, in the preferred embodiments of the present invention, the following invention is also described. A learning method comprising the following steps: a step of acquiring requests that include profile information of people who will evaluate images that have been stored or displayed, a step of extracting a group of images from within a plurality of images that have been managed by a specified image database in accordance with the profile information, under conditions such as having been evaluated by a person who conforms to the profile information, as a first training data group, a step of extracting a group of images other than the first training data from within a group of images contained in the specified image database as a second training data group, and a step of creating an inference model that is capable of identifying to which data group images contained in the first and second training data groups belong. Also, with this learning method, in the step of extracting the first training data group, images that have been classified in a specified theme are extracted as the first training data on the basis of a group of images corresponding to the theme of the specified image database. Also, with the learning method, further, the specified image database may also contain images that have been evaluated by a person of a demographic that does not correspond to a profile that has been requested.

Also, in the preferred embodiments of the present invention, the following invention is also described. A learning complete model that is made capable of identifying first and second training data groups, and that were learned with a training data group for identifying within which of the first and second training groups an image that has been acquired will be classified: the first training data group being results of having extracted the group of images from within a plurality of images that have been managed by a specified image database under conditions such as having been evaluated by a person that conforms to a profile, in accordance with profile information that has been designated, and the second training data group being results of having extracted a group of images other than the first training data from within an image group contained in the specified image database. Also, with the learning complete model, the first and second training data groups may further be images that have been evaluated by people that match the profile for a specified target, and images that have not been evaluated. Further, with the learning complete model, the first and second training data groups may further be images that have been evaluated by people that conform to the profile for a specified target, and images that have been evaluated by people that do not conform to the profile.

Also, in the preferred embodiments of the present invention, the following invention is also described. An image database having image groups, as described in the following, comprising: a first training data group for machine learning as results of having extracted an image group from among a plurality of images that have been controlled, under conditions such as images that have been evaluated by people conforming to a specified profile, and a second training data group for machine learning as results of having extracted an image group other than the first training data, including evaluation results by people that do not conform to the profile, from among the plurality of images that have been controlled. Also, the image database is capable of further selecting the first and second training data groups for machine learning using themes. Also, the image database is capable of providing profile classification information or theme classification information for classifying the first and second training data groups for machine learning.

Also, in the preferred embodiments of the present invention, the following invention is also described. An inference model having inputs and outputs as described in the following, comprising: inputting images that have been acquired, extracting images that have been evaluated by people who conform to a profile from among a plurality of images that have been controlled by a specified image database in accordance with profile information of people who evaluate images stored externally, making this group of images that has been extracted into a training data group, generating the inference model by performing machine learning using the training data group, and if inference is performed on the images that have been acquired using the inference model, outputting evaluations as to whether or not these acquired images are similar to images of the training data group than images that are not of the training data group. Also, the inference model outputs numerical values in order to determine evaluation improvement as a result of inputting images that have been subjected to changes in acquisition conditions on images that have been already acquired.

Also, in the preferred embodiments of the present invention, the following invention is also described. A non-transitory computer-readable medium storing a processor executable code, the processor executable code, when executed by at least one processor, causing a computer to execute input of images that have been acquired, extraction of images that have been evaluated by people who conform to a profile from among a plurality of images that have been controlled in a specified image database, in accordance with profile information of people who will evaluate images that have been stored externally, making of this extracted image group into a training data group, and generating of an inference model by performing machine learning using the training data groups, performing of inference on the images that have been acquired using the inference model, and outputting of evaluations as to whether or not an image is closer to images of the training data group than to images that are not in the training data group. Anon-transitory computer-readable medium storing processor executable code that causes a computer to execute the above described learning method.

It should be noted that in each of the preferred embodiments of the present invention, learning in the learning device has been performing by deep learning, but this is not limiting, and may also be any learning that uses artificial intelligence, such as machine learning. Also, the setting section 16 (refer to FIG. 1) and the setting section 1c2 (refer to FIG. 6) set requests by selecting setting items and using input of text, but this is not limiting, and targets of deep learning may also be set by the user designating one or a plurality of images that they like.

Also, in the preferred embodiments of the present invention the learning device receives requests from the imaging device, but the present invention is not limited to an imaging device, and requests may also be received from an external unit such as a personal computer, or portable information unit (including a smart phone). In this case, results of machine learning in the learning device (inference models, etc.) do not need to be returned to the device that transmitted the request, and can be transmitted to another external device. For example, in a portable information unit, such as a smart phone, a request may be set and transmitted to the learning device, and then results of machine learning by the learning device transmitted to an imaging device such as a camera. Specifically, request setting and transmission is performed by the user on the portable information unit, the camera receives an inference model that has been generated based on the request from the learning device, and display may be performed based on this inference model.

Also, with this embodiment, an instrument for taking pictures has been described using a digital camera, but as a camera it is also possible to use a digital single lens reflex camera, a mirrorless camera or a compact digital camera, or a camera for movie use such as a video camera, and further to have a camera that is incorporated into a mobile phone, a smartphone, a mobile information terminal, personal computer (PC), tablet type computer, game console, etc., a medical camera, or a camera for a scientific instrument such as a microscope, a camera for mounting on a vehicle, a surveillance camera, etc. In any event, it is possible to apply the present invention to a device that is capable of being input with image data, and is capable of directly or indirectly accessing an external image database.

Also, with this embodiment description has been mainly given of examples from the general consumer market, more specifically of a category of devices that perform shooting of photographs. However, this is not limiting, and application is also possible to imaging and observation for professional use. The term "photograph" may be replaced with other professional terms. For example, with artificial intelligence (AI) where defective items are found from factory working data, etc. Also, since detection efficiency is lowered if working procedures change, there is a problem in constantly reviewing a prediction model (inference model). An inference model for this type of defective item detection also uses requests that indicate images intended by a user (here, a factory quality control manager). Also, the evaluation of images in this embodiment may be applied by, for example, replacing images receiving a given evaluation from a third party with groups of images that have been identified as good or bad by an examiner having a high degree of specialty. At this time, if application of weighting to good and bad is performed, then numerical information such as a large number of "likes", that has been described within the embodiments, can be substituted using evaluation values that have been quantified. However, there is no need for specific and objective information, and subjective judgment as an overall impression is sufficient.

Also, in this embodiment, description has been given for example such as images and videos. However, the present invention is not limited to images and videos, and since it is also possible give an evaluation of "like" to voice data of a good performance or good singing, it can also be applied to karaoke or the like. Regarding the human senses, as it were, the present invention can be widely applied to data to which objective and subjective good or bad judgments, or approved or not approved, exemplified by "like", are assigned. That is, the invention of this application can also be applied to technology expanding the term "photograph" in the embodiments of the present invention to "voice" or "information effecting the human senses", etc. Such "like" for images represents not only those images and videos themselves, but also impressions, evaluations or obtained effects of backgrounds and atmosphere sensed from things that are being depicted, and such "likes" can also be used to analyze evaluation of things that have been depicted. That is, it is possible to evaluate actions such as expressions and poses, fashion and accessories, and to evaluate behavior of an animal, such as a pet, and further weather and street view. It goes without saying that the present invention can be applied in the advertising field where catchy content is sent to specified targets, and can broaden applications from urban design, construction, the cosmetic field, and further to the fields of education, medicine, science and industry. If voice, etc., is applied to teaching, it becomes possible to also develop new products such as microphones and audio recording devices presented with a manner of speaking giving a good impression to a specified target, and it also becomes possible to design mirrors that can give advice on what type of make up would be favored by people depending on their country and cultural background, etc.

Also, in recent years, it has become common to use artificial intelligence such as being able to determine various evaluation criteria in one go, and it goes without saying that there may be improvements such as unifying each branch, etc., of the flowcharts shown in this specification, and this is within the scope of the present invention. Regarding this type of control, as long as it is possible to the user to input whether or not something is good or bad, it is possible to customize the embodiment shown in this application in a way that is suitable to the user by learning the user's preferences.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
    an image input section that generates image data;
    a setting circuit that sets a request including a target third party evaluator profile specified based on a user input;
    a transmission circuit that transmits the request to an external machine learning device;
    a reception circuit that receives at least one inference model that was transmitted directly or indirectly from the external machine leaning device, wherein the at least one inference model was generated by the external machine learning device using image training data which was retrieved from a database using the third party evaluator profile included in the request;

an inference engine that provides an inference result using the received at least one inference model and the image data generated by the image input section; and a display that displays the inference result that was provided by the inference engine.

2. The imaging device of claim 1, wherein the image data generated by the image data input section includes through image data, and wherein the display further displays the through image data.

3. The imaging device of claim 1, wherein:

the external machine learning device, when an inference model, that has reliability in range of image data for which the machine learning has been decided, has been generated, outputs that inference model as an interim inference model.

4. The imaging device of claim 1, wherein:

the external machine learning device creates image data constituting a population based on the request, from image data that has been stored in an image database.

5. The imaging device of claim 1, wherein:

the external machine learning device creates advice information for shooting images that fit the inference model, and the transmission circuit transmits the advice information to the external machine learning device.

6. The imaging device of claim 1, wherein:

the request further includes a theme of a photograph the user wants.

7. The imaging device of claim 1, wherein:

the external machine learning device extracts data that matches the requests, and that includes evaluation information for which there is a difference in subjective evaluation for each data, from within a database, performs machine learning using groups of this extracted data, and outputs inference models for subjective evaluation prediction.

8. The imaging device of claim 7, wherein:

the external machine learning device respectively extracts groups of data for which a value representing evaluation is higher than a given value and groups of data for which a value representing evaluation is lower than a given value, from within the database, performs deep learning, and outputs inference models.

9. An imaging method, comprising:

generating image data;

setting a request including a target third party evaluator profile specified based on a user input;

transmitting the request to an external machine learning device;

receiving at least one inference model that was transmitted directly or indirectly from the external machine learning device, wherein the at least one inference model was generated by the external machine learning device using image training data which was retrieved from a database using the third party evaluator profile included in the request;

providing an inference result using the received at least one inference model and the image data generated; and displaying the inference result that was provided.

10. The imaging method of claim 9, wherein the image data generated includes through image data, the imaging method further comprising:

displaying the through image data.

11. The imaging method of claim 9, further comprising:

responsive to generating an inference model that has reliability in range of image data for which the machine learning has been decided, outputting that inference model as an interim inference model.

12. The imaging method of claim 9, further comprising:

creating image data constituting a population based on the request, from image data that has been stored in an image database.

13. The imaging method of claim 9, further comprising:

creating advice information for shooting images that fit the inference model; and transmitting the advice information to the external machine learning device.

14. The imaging method of claim 9, wherein:

the request further includes a theme of a photograph the user wants.

15. The imaging method of claim 9, further comprising:

extracting data that matches the requests, and that includes evaluation information for which there is a difference in subjective evaluation for each data, from within a database;

performing machine learning using groups of this extracted data; and outputting inference models for subjective evaluation prediction.

16. The imaging method of claim 15, further comprising:

extracting groups of data for which a value representing evaluation is higher than a given value and groups of data for which a value representing evaluation is lower than a given value, from within the database;

performing deep learning, and outputting inference models.

17. A non-transitory computer-readable medium storing processor-executable instructions which, when executed by at least one processor, cause the at least one processor to perform an imaging method, including:

generating image data;

setting a request including a target third party evaluator profile specified based on a user input;

transmitting the request to an external machine learning device;

receiving at least one inference model the external machine learning device, wherein the at least one inference model was generated by the external machine learning device using image training data which was retrieved from a database using the third party evaluator profile included in the request;

providing an inference result using the received at least one inference model and the image data generated; and displaying the inference result that was provided.

18. The non-transitory computer-readable medium of claim 17, wherein the image data generated includes through image data, the imaging method further including:

displaying the through image data.

19. The non-transitory computer-readable medium of claim 17, wherein the method further includes:

creating advice information for shooting images that fit the inference model; and transmitting the advice information to the external machine learning device.

20. The non-transitory computer-readable medium of claim 17, wherein:

the request further includes a theme of a photograph the user wants.

* * * * *